(12) United States Patent
Uenaka et al.

(10) Patent No.: US 6,766,111 B2
(45) Date of Patent: Jul. 20, 2004

(54) CAMERA SYSTEM HAVING A COMMUNICATION SYSTEM BETWEEN A CAMERA BODY AND A PHOTOGRAPHING LENS

(75) Inventors: Yukio Uenaka, Saitama (JP); Hiroyuki Takahashi, Tochigi (JP); Masahiro Kawasaki, Saitama (JP)

(73) Assignee: Pentax Corporation, Tokyo (JP)

( * ) Notice: Subject to any disclaimer, the term of this patent is extended or adjusted under 35 U.S.C. 154(b) by 157 days.

(21) Appl. No.: 10/083,619

(22) Filed: Feb. 27, 2002

(65) Prior Publication Data

US 2002/0118972 A1 Aug. 29, 2002

(30) Foreign Application Priority Data

Feb. 28, 2001 (JP) ........................................ 2001-054542

(51) Int. Cl.[7] ............................................... G03B 13/22
(52) U.S. Cl. ........................ 396/91; 396/236; 396/532
(58) Field of Search ........................... 396/71, 91, 227, 396/236, 532

(56) References Cited

U.S. PATENT DOCUMENTS

| | | |
|---|---|---|
| 4,841,322 A | 6/1989 | Kawasaki et al. |
| 4,974,004 A | 11/1990 | Kawasaki et al. |
| 5,068,680 A | 11/1991 | Kawasaki et al. |
| 5,166,717 A | 11/1992 | Kawasaki et al. |
| 5,170,200 A | 12/1992 | Kawasaki et al. |
| 5,170,203 A | 12/1992 | Kawasaki et al. |
| 5,181,061 A | 1/1993 | Kawasaki et al. |
| 5,182,591 A | 1/1993 | Kawasaki et al. |
| 5,223,877 A | 6/1993 | Kawasaki et al. |
| 5,227,832 A | 7/1993 | Kawasaki et al. |
| 5,255,046 A | 10/1993 | Kawasaki et al. |
| 5,355,192 A | 10/1994 | Kawasaki et al. |
| 5,416,555 A | 5/1995 | Kawasaki et al. |
| 5,432,584 A | 7/1995 | Suzuki et al. |
| 5,505,535 A | 4/1996 | Kawasaki et al. |
| 5,664,234 A | 9/1997 | Kawasaki et al. |
| 5,713,052 A | 1/1998 | Kawasaki et al. |
| 5,761,560 A * | 6/1998 | Miyazawa et al. ........... 396/532 |
| 5,809,354 A * | 9/1998 | Miyazawa et al. ........... 396/301 |
| 5,845,156 A | 12/1998 | Onuki |
| 6,341,902 B1 | 1/2002 | Sato et al. |

FOREIGN PATENT DOCUMENTS

| | | |
|---|---|---|
| EP | 0359240 | 3/1990 |
| JP | 5-66450 | 3/1993 |

* cited by examiner

Primary Examiner—David M. Gray
(74) Attorney, Agent, or Firm—Greenblum & Bernstein, P.L.C.

(57) ABSTRACT

A camera system having a camera body and a photographing lens, which can be mounted to and dismounted from the camera body, includes a determining device which determines a type of the photographing lens in accordance with data received from the photographing lens; and a body controller which has a function to send body data and individual function data to the photographing lens, wherein each of the individual function data is required for a corresponding function that the photographing lens possesses. The body controller sends all the body data to the photographing lens regardless of the type of the photographing lens, and sends a portion of the individual function data which is associated with the type of the photographing lens to the photographing lens.

10 Claims, 29 Drawing Sheets

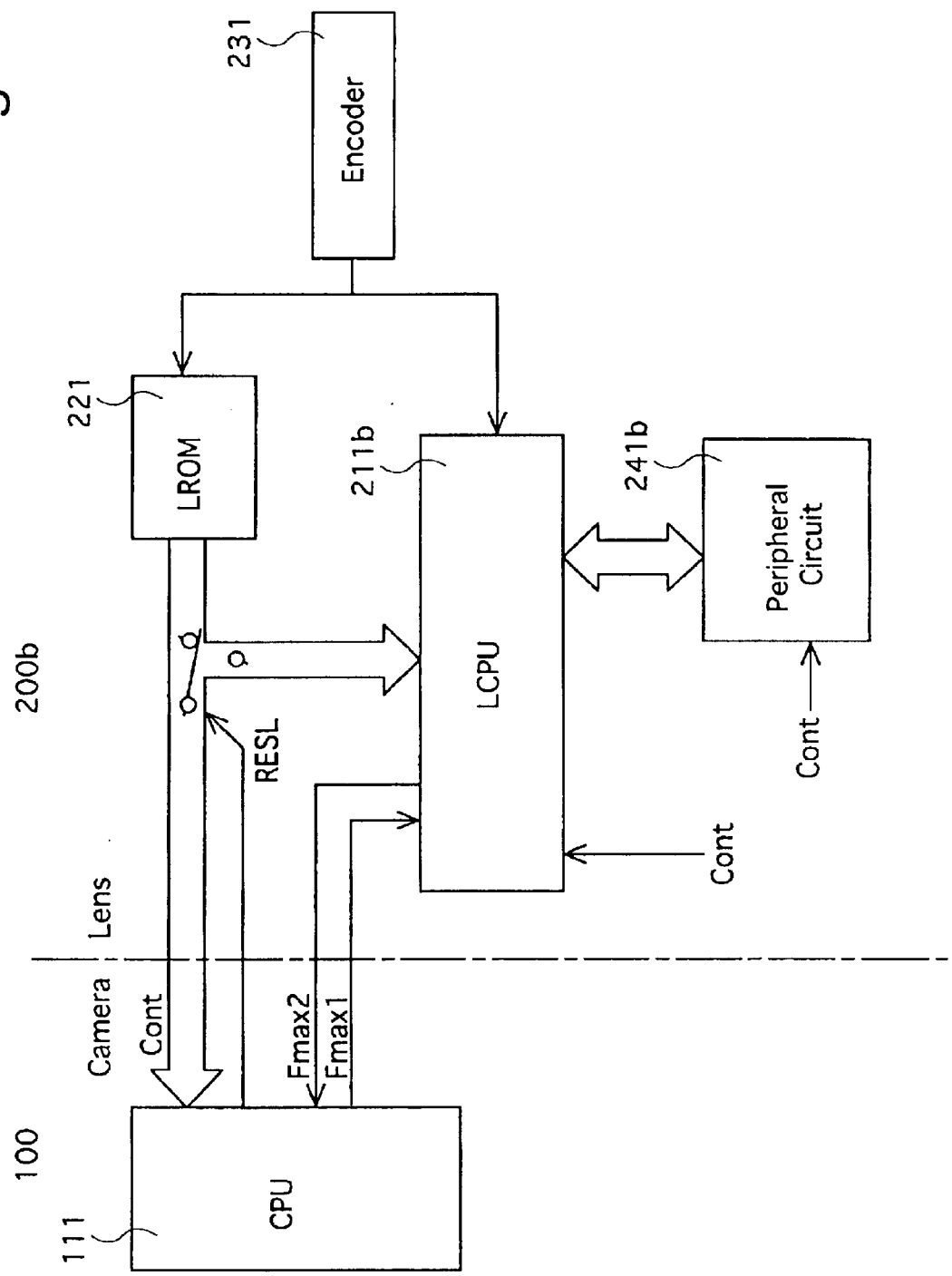

Old-type communication only

New-type communication possible
Determine lens type and carry out communication according to lens type Communication starts upon receipt of communication request (Fmax1 Lo)
Sleep mode→Normal mode if in sleep mode
Drive lens according to contents of communication

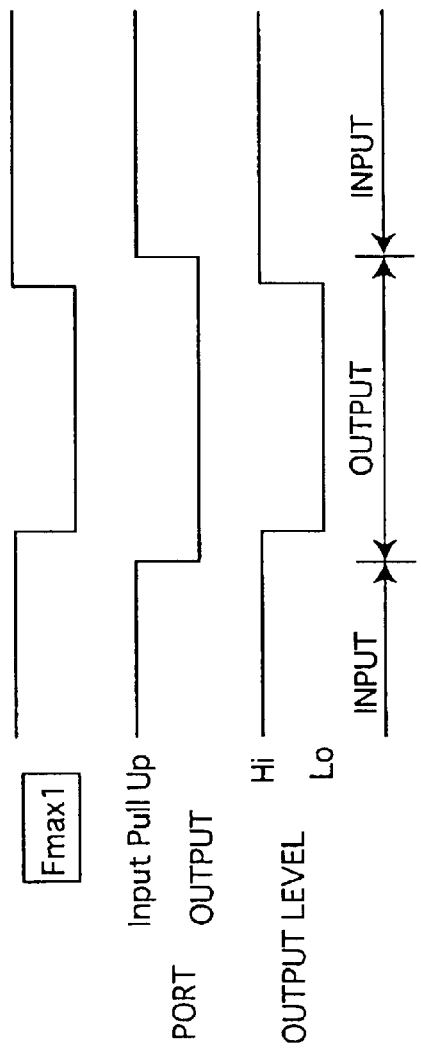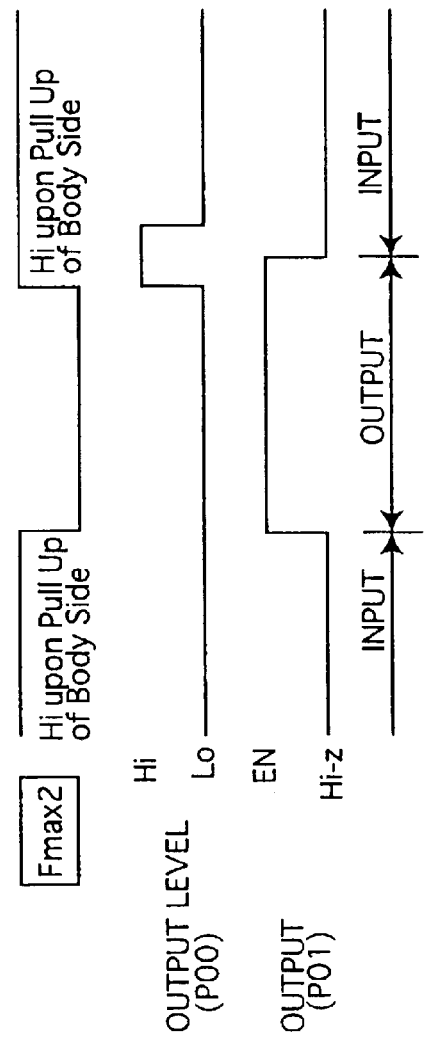

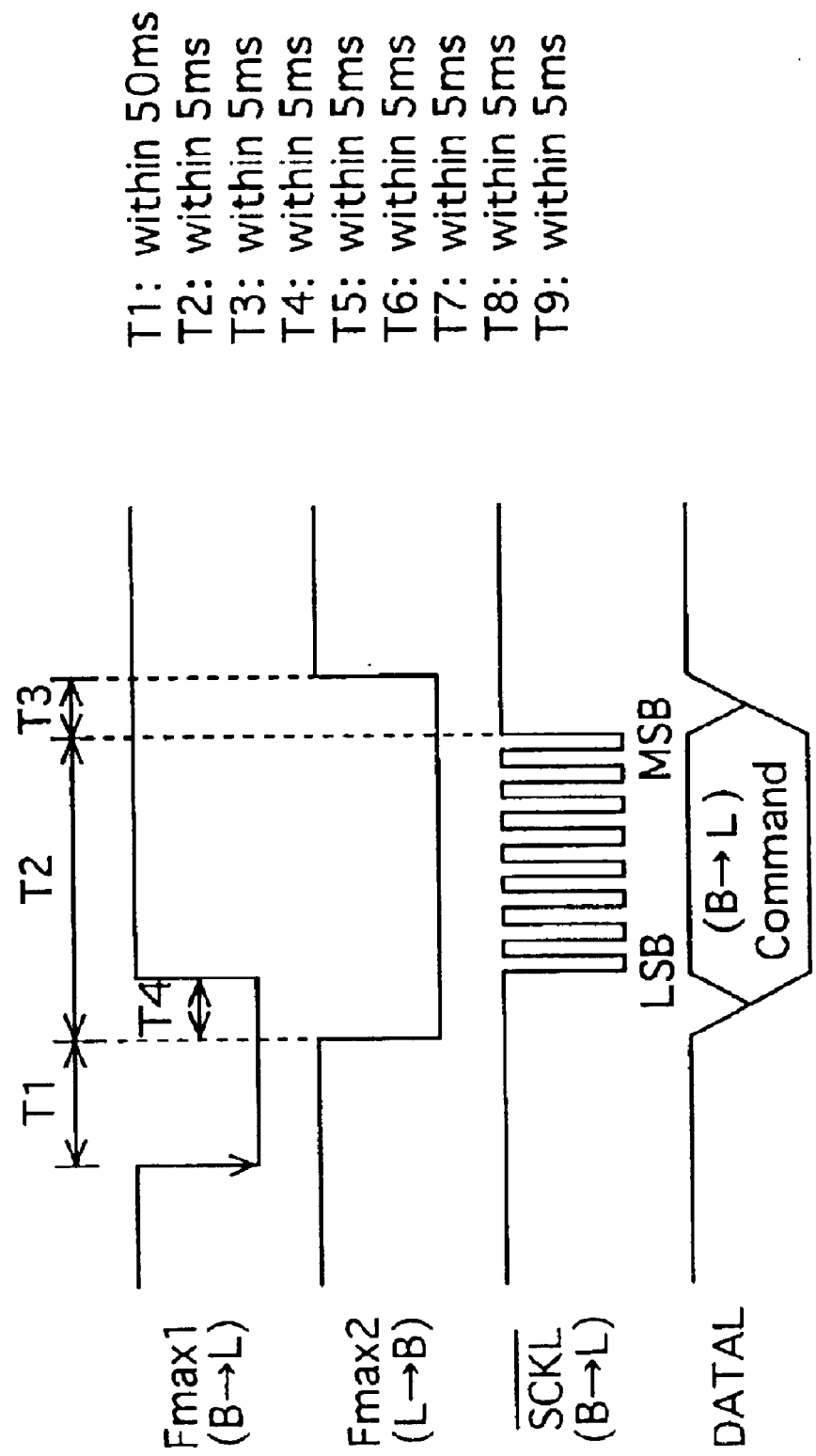

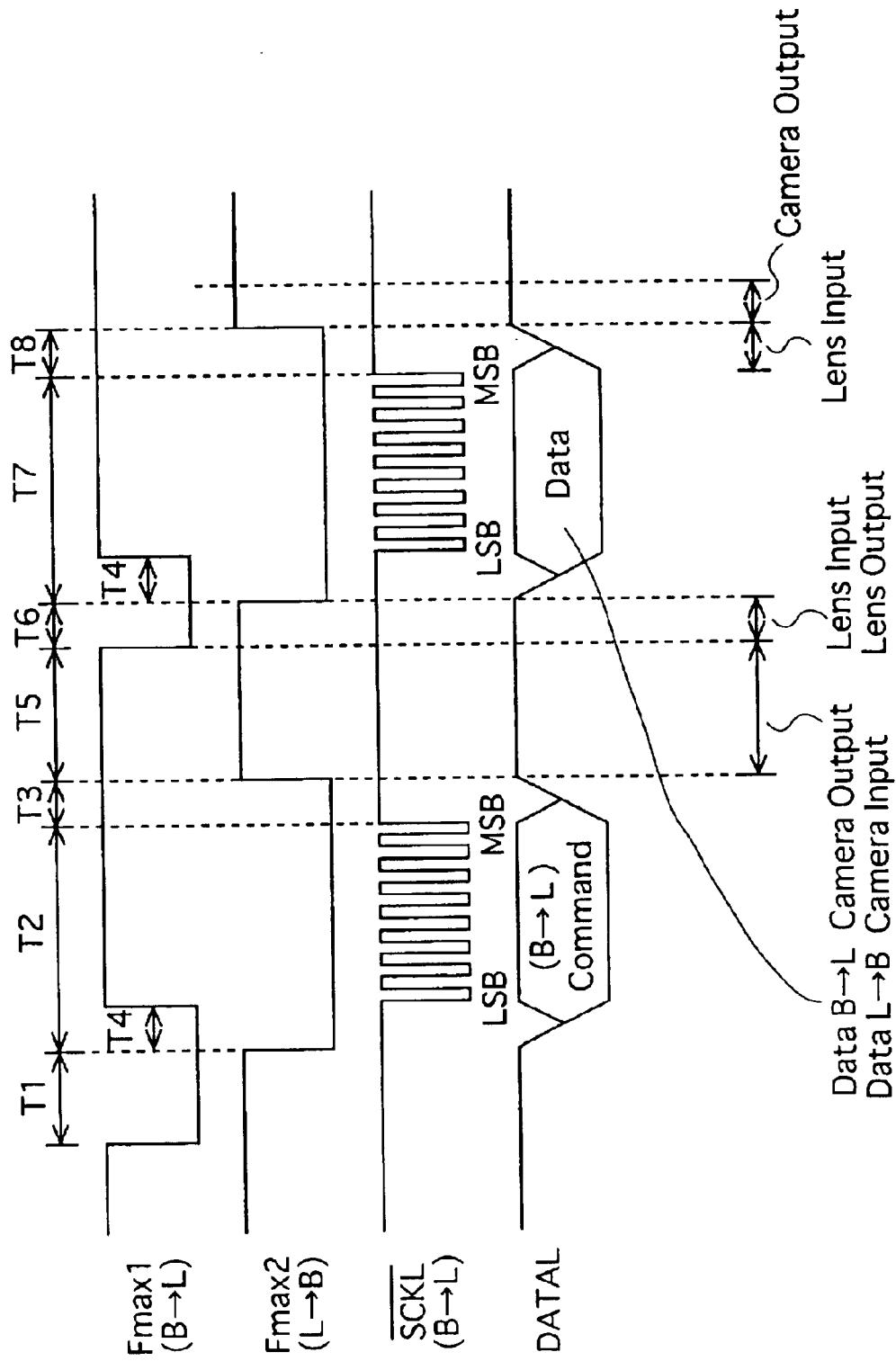

CAMERA SYSTEM HAVING A COMMUNICATION SYSTEM BETWEEN A CAMERA BODY AND A PHOTOGRAPHING LENS

BACKGROUND OF THE INVENTION

1. Field of the Invention

The present invention relates to a camera system having a camera body and a photographing lens which is detachably attached to the camera body, and having a communication system between the camera body and the photographing lens.

2. Description of the Related Art

Power zoom lenses (motorized zoom lenses) with an image size tracking mode, in which the camera can automatically zoom the lens to constantly capture the object at a predetermined image size regardless of the distance to the object, within the constraints of the focal length range, are known in the art. In recent camera systems having a camera body and an interchangeable photographing lens which is detachably attached to the camera body, if the above-described type of power zoom lens with the image size tracking mode is employed, the camera body prepares only data necessary for a controller of the photographing lens to perform operations thereof in the image size tracking mode, and transmits such data to the photographing lens together with various control commands.

However, according to such a data transmission system of the camera system, if the development of an interchangeable photographing lens having one or more additional functions (e.g., a lens autofocus function) is intended, the camera body to which the photographing lens is mounted will need to prepare camera-status data necessary for the photographing lens to operate for each of all the functions of the photographing lens. This complicates various communication processes and controls of the camera system. On the other hand, if an interchangeable photographing lens having one or more new functions is mounted to a conventional type camera body, it is often the case that such new functions cannot be used and may cause the camera body to malfunction. Accordingly, the development of an interchangeable photographing lens having one or more new functions which maintains compatibility with existing camera bodies is difficult in conventional camera systems. In addition, the development of a camera body which can maintain compatibility with a newer developed interchangeable photographing lens is also difficult in conventional camera systems.

SUMMARY OF THE INVENTION

The present invention provides a camera system having a camera body and a photographing lens which is detachably attached to the camera body, wherein the camera system is designed to increase the degree of freedom in the development of the photographing lens with one or more additional new functions, and the general versatility of the camera body and the photographing lens is increased.

For example, in an embodiment, a camera system having a camera body and a photographing lens, which can be mounted to and dismounted from the camera body, is provided, wherein the camera body includes a determining device which determines a type of the photographing lens in accordance with data received from the photographing lens; and a body controller which has a function to send body data and individual function data to the photographing lens, wherein each of the individual function data is required for a corresponding function that the photographing lens possesses. The body controller sends all the body data to the photographing lens regardless of the type of the photographing lens, and sends a portion of the individual function data which is associated with the type of the photographing lens to the photographing lens.

The body controller can send all the body data to the photographing lens at regular intervals, and selectively send the individual function data to the photographing lens in accordance with the type of the photographing lens.

It is desirable for the photographing lens to include a lens controller, which can communicate with the body controller, wherein the lens controller sends lens type data, which indicates the type of the photographing lens, to the camera body.

If the body controller receives the lens type data output from the lens controller, the body controller can send corresponding the individual function data to the photographing lens.

The body data can include fundamental data of the camera body.

The body data can include data for a power saving operation.

In another embodiment, a camera body is provided, to which a photographing lens can be mounted and dismounted, including a determining device which determines a type of the photographing lens in accordance with data received from the photographing lens and a body controller which has a function to send body data and individual function data to the photographing lens, wherein each of the individual function data is required for a corresponding function that the photographing lens possesses. The body controller sends all the body data to the photographing lens regardless of the type of the photographing lens, and sends a portion of the individual function data which is associated with the type of the photographing lens to the photographing lens.

If the body controller receives the lens type data output from the lens controller, the body controller can send corresponding the individual function data to the photographing lens.

It is desirable for the body controller to send all the body data to the photographing lens at regular intervals, and selectively send the individual function data to the photographing lens in accordance with the type of the photographing lens.

In another embodiment, a photographing lens is provided, which can be mounted to, and dismounted from, a camera body, the camera body having a body controller which has a function to send body data and individual function data to the photographing lens, wherein each of the body data indicates an operating status of the camera body, and wherein each of the individual function data is required for a corresponding function that the photographing lens possesses, the photographing lens including a lens controller which can communicate with the body controller, and can send lens type data which indicates the type of the photographing lens to the camera body.

The present disclosure relates to subject matter contained in Japanese Patent Application No.2001-54542 (filed on Feb. 28, 2001) which is expressly incorporated herein by reference in its entirety.

BRIEF DESCRIPTION OF THE DRAWINGS

The present invention will be described below in detail with reference to the accompanying drawings in which:

FIG. 5 is a block diagram of fundamental components of a photographing lens which is provided with a lens controller and a peripheral circuit both of which operate with the first power;

FIG. 19A is a timing chart for a handshake operation performed between the camera body and the photographing lens at the commencement of the new-type communication process;

FIG. 19B is a timing chart for a handshake operation performed between the camera body and the photographing lens at the commencement of the new-type communication process;

FIG. 21A is a timing chart for communication in the new-type communication process that is performed between the camera body and the photographing lens;

FIG. 21B is a timing chart for communication in the new-type communication process that is performed between the camera body and the photographing lens;

DESCRIPTION OF THE PREFERRED EMBODIMENTS

Figure 1:
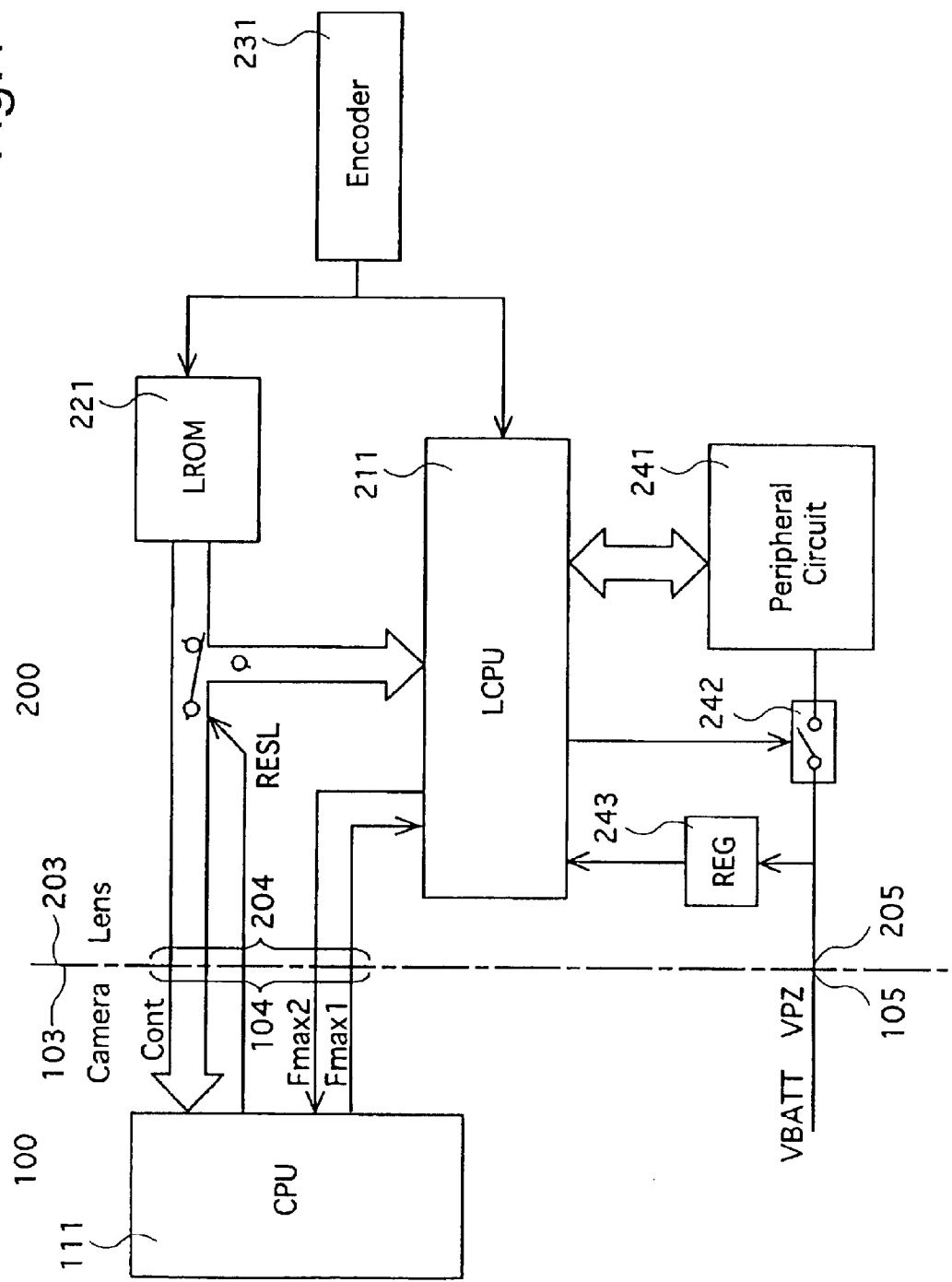
FIG. 1 is a block diagram of fundamental elements of control systems of a camera body and a photographing lens of an SLR camera system having a communication system between the camera body and the photographing lens according to the present invention.

FIG. 1 shows fundamental elements of control systems of a camera body and an interchangeable photographing lens of an embodiment of an SLR camera system to which the present invention is applied. The camera body 100 is provided with a body CPU (body controller/determining device) 111 serving as a controller which comprehensively controls the overall operations of the SLR camera system. The camera body 100 is provided with a body mount 103 to which the photographing lens 200 is mounted. A group of communication/control contacts (body communication line) 104 are provided on the body mount 103. The group of communication/control contacts 104 consists of six contacts in this particular embodiment. One of the six contacts serves as a power contact (constant-voltage contact) for supplying a first power from the camera body 100 to low power elements (e.g., a ROM) provided in the photographing lens 200 to drive the low power elements, while another one of the six contacts serves as a control terminal via which a ROM provided in the photographing lens 200 is enabled or disabled (i.e., turned ON or OFF). A power contact 105 (VPZ) via which a second power is supplied from the camera body 100 to the photographing lens 200 is provided on the body mount 103. The power capacity of the second power that is supplied from the power contact 105 (VPZ) to the photographing lens 200 is substantially greater than that of the first power that is supplied from the aforementioned constant-voltage contact of the group of communication/control contacts 104. Although the supply voltage of the second power is greater than the supply voltage of the first power, the supply voltage of the second power can be identical to the supply voltage of the first power or even smaller than the supply voltage of the first power as long as the power capacity of the second power is substantially greater than the power capacity of the first power.

Although it is desirable that the group of communication/control contacts 104 and the power contact 105 (VPZ) be provided on the body mount 103, the group of communication/control contacts 104 and the power contact 105 (VPZ) can be provided behind the body mount 103 in a mirror box of the camera body 100, in which a quick-return mirror is positioned. Alternatively, it is possible that the group of communication/control contacts 104 be provided on the body mount 103 and the power contact 105 (VPZ) be provided behind the body mount 103 in the mirror box of the camera body 100.

Figure 2:
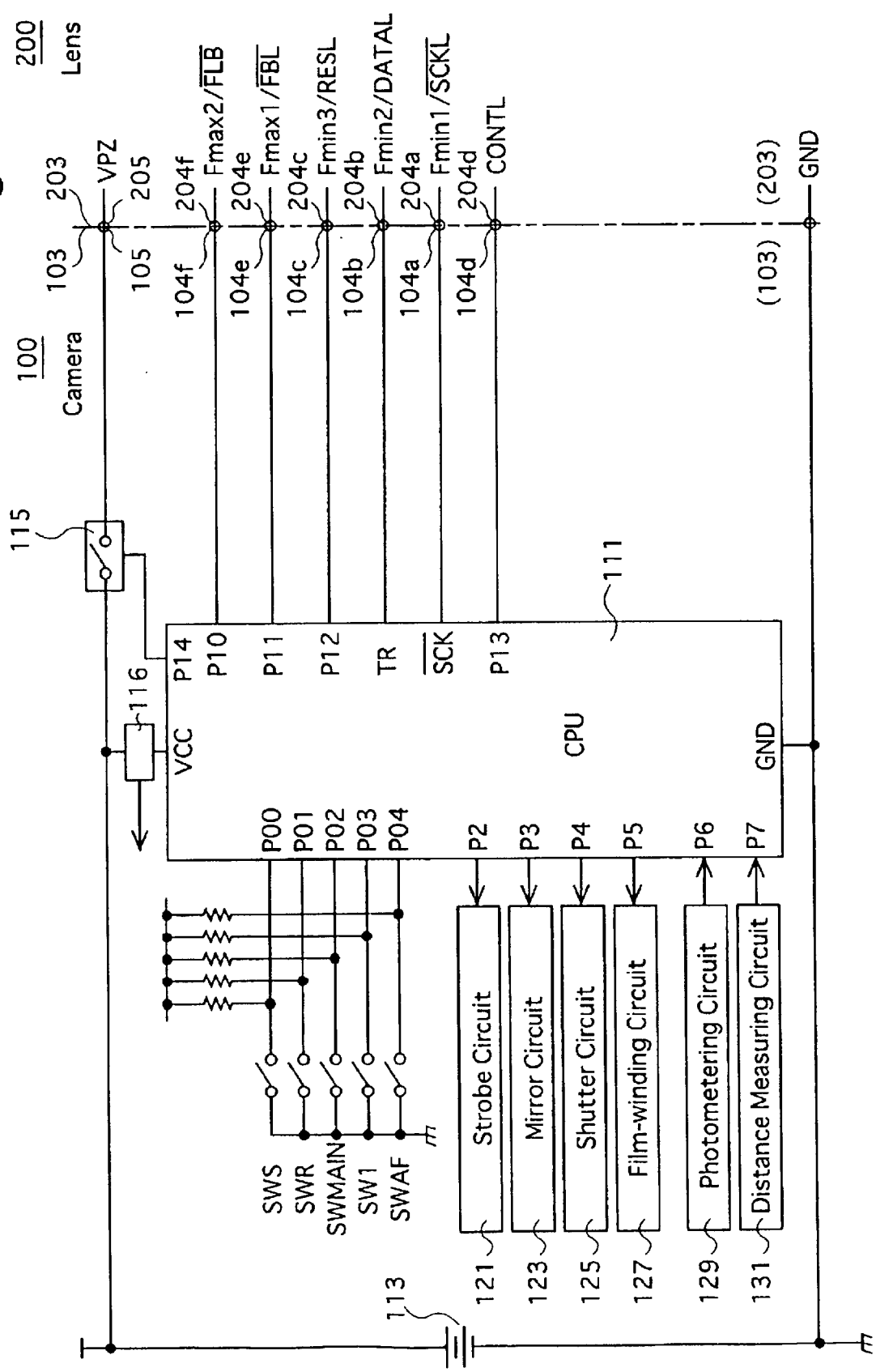
FIG. 2 is a block diagram of fundamental elements of the control system of the camera body.

FIG. 2 shows fundamental elements of the control system of the camera body 100. A photometering switch SWS, a release switch SWR, a main switch SWMAIN, an image-shake compensation switch SW1 and an AF switch SWAF are connected to the body CPU 111, which serves as a controller that comprehensively controls the overall operations of the SLR camera system.

The power to peripheral circuits of the camera body 100 is turned ON and OFF when the main switch SWMAIN is turned ON and OFF, respectively. The power from a battery 113 accommodated in the camera body 100 is supplied to each peripheral circuit of the camera body 100 via a regulator (DC/DC converter) 116 when the main switch SWMAIN is turned ON, and the power from the battery 113 to each peripheral circuit of the camera body 100 is cut off when the main switch SWMAIN is turned OFF. The body CPU 111 is always supplied with power from the battery 113 via the regulator 116, so that the body CPU 111 is in operation at all times.

The camera body 100 is provided with a strobe circuit 121, a mirror circuit 123, a shutter circuit 125, a film-winding circuit 127, a photometering circuit 129 and a distance measuring circuit 131, which are all connected to the body CPU 111. The photometering switch SWS is turned ON when a release button (not shown) is the camera body is depressed by half a step, and the release switch SWR is turned ON when the release button is fully depressed. Immediately after the photometering switch SWS is turned ON, the body CPU 111 actuates the photometering circuit 129 to perform a photometering operation. At the same time, the body CPU 111 calculates and sets an optimum shutter speed and an optimum aperture value (f-number), and actuates the strobe circuit 121 to perform a strobe charging process as needed. Furthermore, the body CPU 111 actuates the distance measuring circuit 131 to determine an amount of defocus, to perform an autofocus process if an autofocus mode has been set via the AF switch SWAF. Immediately after the release switch SWR is turned ON, the body CPU 111 actuates the shutter circuit 125 to drive a focal plane shutter mechanism (not shown) to expose a film frame. Upon completion of an exposure, the body CPU 111 actuates the film-winding circuit 127 to wind up film by one frame and at the same time to charge the focal plane shutter mechanism.

When the new-type photographing lens (e.g., a KAF III type photographing lens having a lens CPU, a lens ROM, and all of the communication functions which correspond with those of the camera body 100) 200 is mounted to the camera body 100, during the time the main switch SWMAIN is ON, the body CPU 111 turns ON a switch circuit 115 to supply the power from the battery 113 as the aforementioned second power to the photographing lens 200 via the power contact 105 (VPZ) of the camera body 100 and associated power contact 205 (VPZ) of the photographing lens 200, which is in contact with the power contact 105 (VPZ). In addition, if an image-shake compensation mode has been set via the image-shake compensation switch SW1, and if the photographing lens 200 is provided with an image-shake compensation device, the body CPU 111 outputs an image-shake compensation command to the photographing lens 200 via lens communication to make the photographing lens 200 perform an image-shake compensation operation. If the photographing lens 200 mounted to the camera body 100 is further provided therein with a lens AF system, the body CPU 111 outputs defocus data (e.g., the amount of driving of an AF motor 261 (see FIG. 22A) and the direction of driving of the AF motor in the photographing lens 200) to the photographing lens 200 via lens communication to make the photographing lens 200 perform a lens autofocus process.

As shown in FIG. 22A, an encoder 231, the AF motor (focusing lens driving device) 261, an AF lens group (focusing lens group) Lf, and the lens CPU 211 constitute a focus adjusting system (electrical component).

Figure 12A:
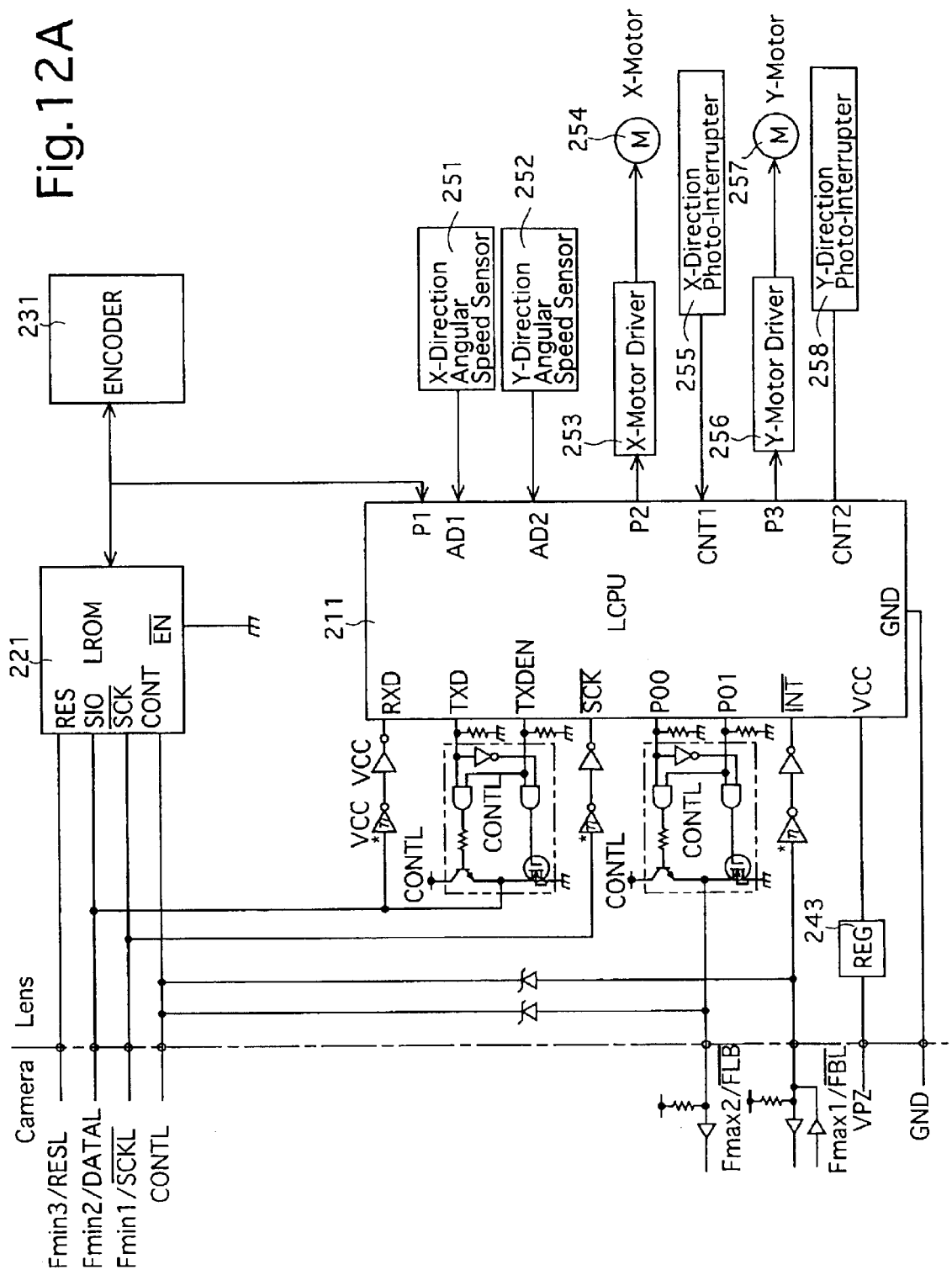
FIG. 12A is a block diagram of fundamental elements of a control system of the first embodiment of the photographing lens which incorporates an image-shake compensation device.

The photographing lens 200 is provided on a lens mount 203 thereof with a group of communication/control contacts (lens communication line) 204 and the power contact 205 (VPZ). The group of communication/control contacts 204 and the power contact 205 (VPZ) come into contact with the group of communication/control contacts 100, respectively, when the photographing lens 200 is mounted to the body mount 103 of the camera body 100 via the lens mount 203. The photographing lens 200 is provided therein with a lens CPU (LCPU/lens controller/electronic device) 211, a lens ROM (LROM/lens memory/nonvolatile lens memory) 221, the encoder 231 and a peripheral circuit 241. Various modes and parameters are stored in the lens ROM 221. A current focal length (zoom code) and a photographic distance are detected via the encoder 231. The peripheral circuit 241 includes for example, as shown in FIG. 12A, image-shake compensation motors (X-motor 254 and Y-motor 257), the AF motor 261, and a power zoom motor (power zoom driving device) 264, which are all provided in the photographing lens 200. Note that the power zoom motor 264 is connected to a lens group Lz, wherein the lens group Lf and the lens group Lz constitute at least part of a zoom lens system of the photographing lens 200.

The group of communication/control contacts 104 of the camera body 100 consists of six contacts: a first contact 104a (Fmin1/Inverse-SCKL), a second contact 104b (Fmin2/DATAL), a third contact 104c (Fmin3/RESL), a fourth contact 104d (CONTL), a fifth contact 104e (Fmax1/Inverse-FBL) and a sixth contact 104f (Fmax2/Inverse-FLB). Likewise, the group of communication/control contacts 204 of the photographing lens 200 consists of six contacts: a first contact 204a (Fmin1/Inverse-SCKL), a second contact 204b (Fmin2/DATAL), a third contact 204c (Fmin3/RESL), a fourth contact 204d (CONTL), a fifth contact 204e (Fmax1/Inverse-FBL) and a sixth contact 204f (Fmax2/Inverse-FLB) which come into contact with the first through sixth contacts 104a through 104f respectively, when the photographing lens 200 is mounted to the camera body 100.

The power line from port P13 of the body CPU 111 to the fourth contact 104d constitutes a first body power line for supplying the first power to the photographing lens 200. The power line from the battery 113 to the power contact 105 (via the switch circuit 115) constitutes a second body power line for supplying the second power to the photographing lens 200. The power line from the fourth contact 204d to a port CONT of the lens ROM 221 constitutes a first lens power line for supplying power from the camera body 100 to the photographing lens 200. The power line from the power contact 205 to a regulator 243 and to a switching circuit 242 constitutes a second lens power line for supplying power from the camera body 100 to the lens CPU 211. As shown in FIG. 1, the second power that is output from the camera body 100 to be input to the photographing lens 200 via the power contacts 105 and 205 (VPZ) is supplied to the lens CPU 211 via the regulator 243 of the photographing lens 200 and also to the peripheral circuit 241 via a switching circuit 242 of the photographing lens 200. The lens ROM 221 of the photographing lens 200 operates with constant voltage power (the first power) supplied from the fourth contact 204d (CONTL), whereas the lens CPU 211 operates with the second power having a large power capacity supplied from the power contact (VPZ) 205. The processing speed and the throughput of a CPU is generally proportional to the power consumption of the CPU. Accordingly, in the present embodiment of the SLR camera system to which the present invention is applied, providing the second power having a large power capacity to the photographing lens 200 makes it possible for the photographing lens 200 be provided therein with not only a CPU which achieves a high throughput, but also high power components (i.e., components which require a large current) such as a lens motor and an image-shake compensation device.

Figure 3:
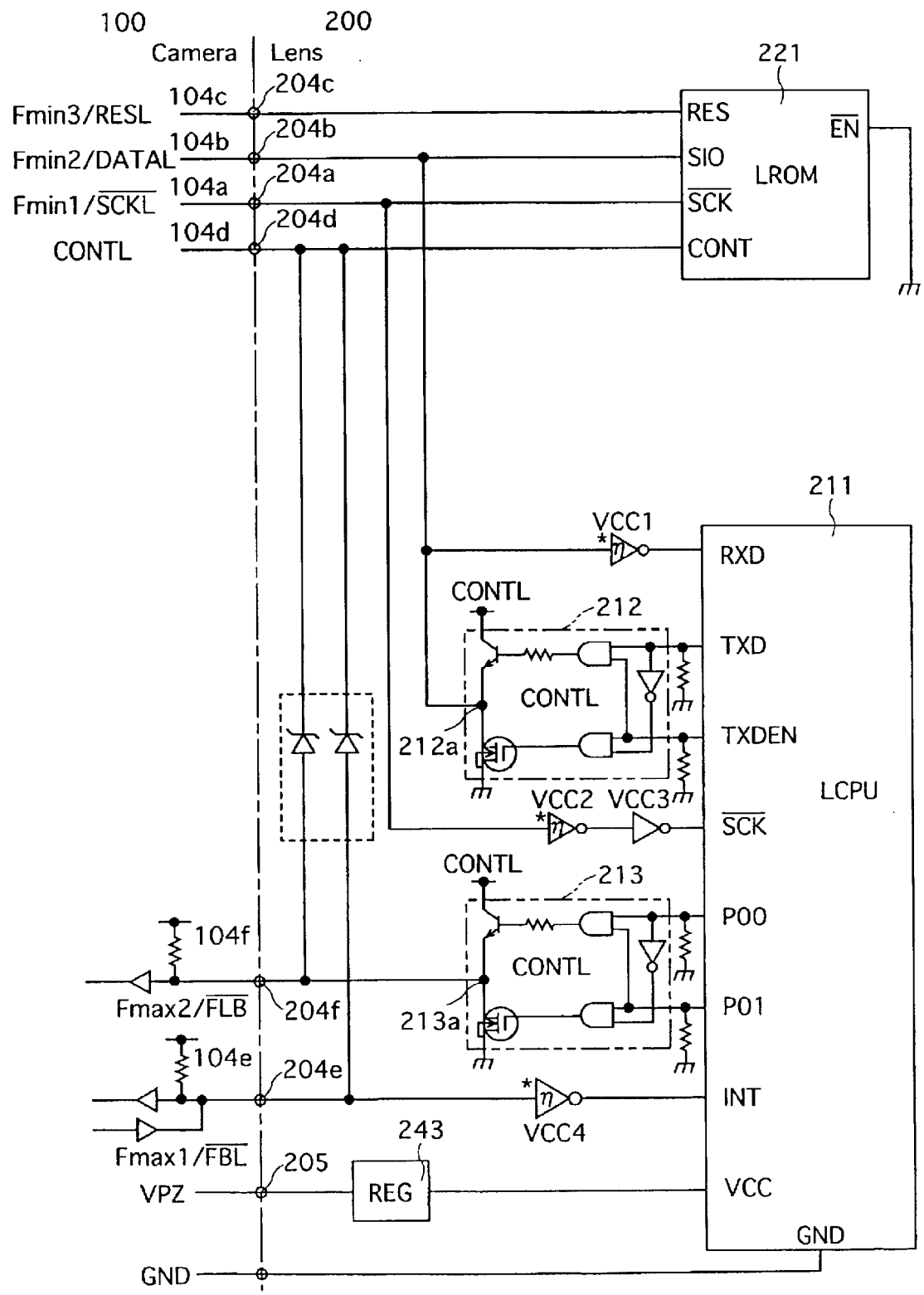
FIG. 3 is a block diagram of fundamental elements of a communication control system of the photographing lens.

FIG. 3 is a block diagram of fundamental elements of a communication control system of the photographing lens 200. The first contact 204a (Fmin1/Inverse-SCKL), the second contact 204b (Fmin2/DATAL), the third contact 204c (Fmin3/RESL), and the fourth contact 204d (CONTL) of the group of communication/control contacts 204, of the photographing lens 200, are connected to four ports RES, SIO, Inverse-SCK, and CONT of the lens ROM 221, respectively.

The port RES of the lens ROM 221 serves as an input port via which the lens ROM 221 inputs a reset signal that changes the state of the lens ROM 221 from a disabled state to an enabled state. The port SIO of the lens ROM 221 serves as an I/O port for serial communication. The port Inverse-SCK of the lens ROM 221 serves as an input port via which the lens ROM 221 inputs a clock signal for communication from the camera body 100. The port CONT of the lens ROM 221 serves an input port via which the lens ROM 221 inputs a constant voltage power (the first power) from the camera body 100.

Figure 20:
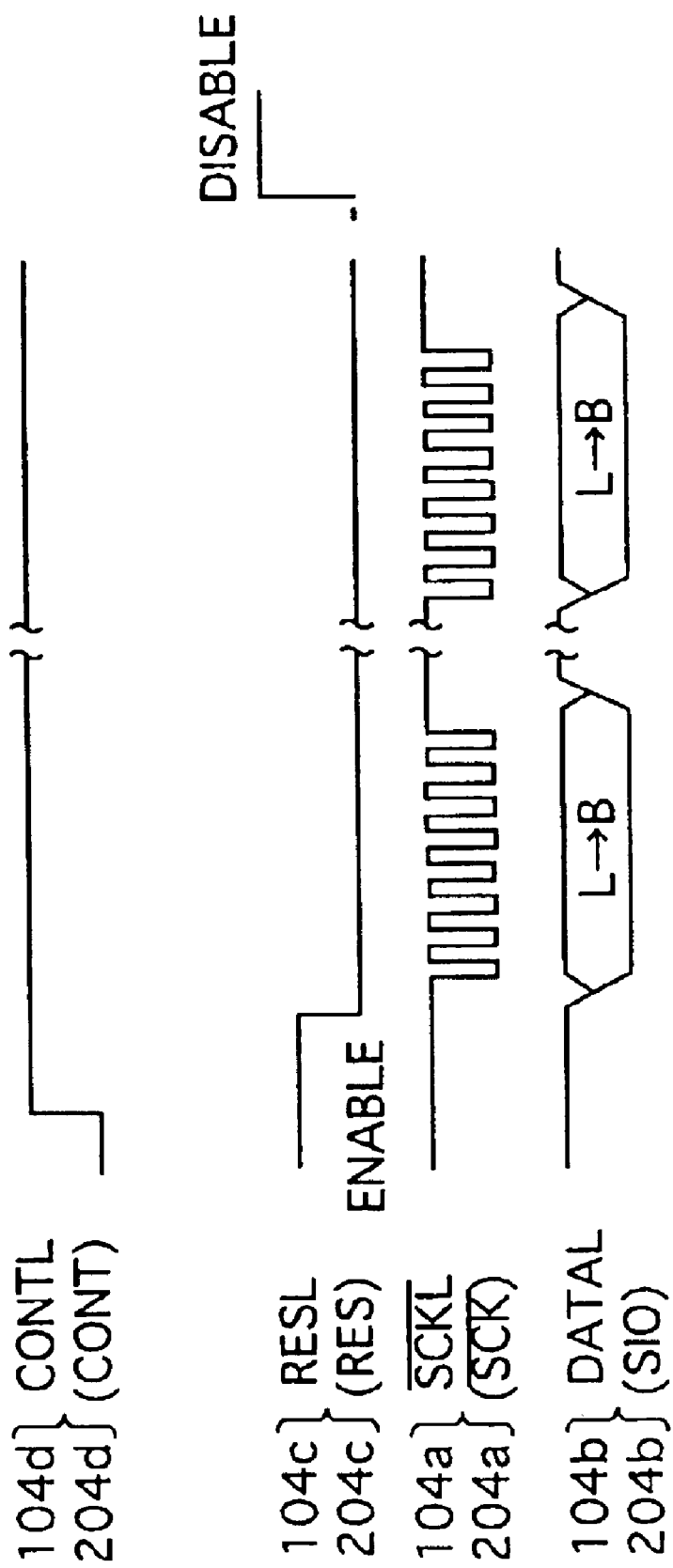
FIG. 20 is a timing chart for an old-type communication process that is performed between the camera body and the photographing lens.

The lens ROM 221 operates in accordance with the first power (constant voltage power), which is supplied from the camera body 100 to be applied to the port CONT of the lens ROM 221. The lens ROM 221 is set to change the state of the lens ROM 221 from a disabled state to an enabled state by a reset signal, which is input via the port RES of the lens ROM 221 to enter the enabled state. Lens data written in the lens ROM 221 is read out therefrom to be output to the camera body 100 via the port SIO of the lens ROM 221, in synchronization with the clock signal input, via the port Inverse-SCK. The port RES of the lens ROM 221 and the third contact 204c (Fmin3/RESL), which is connected to the port RES, also serve as a control line for changing the state of the lens ROM 221 between an enabled state and a disabled state. Namely, the lens ROM 221 operates while the first power is being supplied to the fourth contact 204d (CONTL), and the lens ROM 221 is set to change the state thereof from a disabled state to an enabled state if the level of the third contact 204c (Fmin3/RESL) falls to a low level, and the lens ROM 221 is set to change the state of the lens ROM 221 from an enabled state to a disabled state if the level of the third contact 204c (Fmin3/RESL) rises to a high level. The timing chart thereof is shown in FIG. 20.

As shown in FIG. 3, the lens CPU 211 is provided with eight ports RXD, TXD, TXDEN, Inverse-SCK, P00, P01, INT and VCC, and the photographing lens 200 is provided with first through fourth high input voltage proof Schmitt inverters VCC1, VCC2, VCC3 and VCC4. The first contact 204a (Fmin1/Inverse-SCKL) is connected to the port Inverse-SCK of the lens CPU 211 via the second and third Schmitt inverters VCC2 and VCC3, and the second contact 204b (Fmin2/DATAL) is connected to the port RXD of the lens CPU 211 and also to each of the two ports TXD and TXDEN of the lens CPU 211 via a first I/O protection circuit 212.

The port RXD of the lens CPU 211 serves as a data input port. The port TXD of the lens CPU 211 serves as a data output port. The port TXDEN of the lens CPU 211 serves as a control port via which the lens CPU 211 determines whether data can be output from the port TXD of the lens CPU 211. The port Inverse-SCK of the lens CPU 211 serves as an input port via which the lens CPU 211 inputs a clock signal for communication from the camera body 100.

When the control port TXDEN of the lens CPU 211 is at a high level, if the level of a data output port TXD of the lens CPU 211 rises to a high level, a field effect transistor (FET) of the first I/O protection circuit 212 is turned OFF while a transistor of the first I/O protection circuit 212 is turned ON to thereby cause the level of port 212a to rise to a high level. On the other hand, if the level of the data output port TXD of the lens CPU 211 falls to a low level when the control port TXDEN of the lens CPU 211 is at a high level, the field effect transistor (FET) of the first I/O protection circuit 212 is turned ON while the transistor of the first I/O protection circuit 212 is turned OFF to thereby cause the level of port 212a to fall to a low level. Therefore, when the control port TXDEN of the lens CPU 211 is at a high level, the level of the data output port TXD of the lens CPU 211 is output from the first I/O protection circuit 212 via port 212a to be input to the second contact 204b (Fmin2/DATAL).

Because each of the field effect transistor (FET) and the transistor of the first I/O protection circuit 212 is OFF when the control port TXDEN is at a low level, port 212a is in a high impedance state regardless of the level of the data output port TXD of the lens CPU 211.

The sixth contact 204f (Fmax2/Inverse-FLB) is connected to each of the two ports P00 and P01 of the lens CPU 211 via a second I/O protection circuit 213, while the fifth contact 204e (Fmax1/Inverse-FBL) is connected to the port INT of the lens CPU 211 via the fourth high input voltage proof Schmitt inverter VCC4. The port P00 of the lens CPU 211 serves as an output port while the port P01 of the lens CPU 211 serves as a control port via which the lens CPU 211 determines whether data can be output from the port P00. The port INT of the lens CPU 211 serves as an input port via which the lens CPU 211 inputs an interrupt signal.

When the control port P01 of the lens CPU 211 is at a high level, if the level of the output port P00 of the lens CPU 211 rises to a high level, a field effect transistor (FET) of the second I/O protection circuit 213 is turned OFF while a transistor of the second I/O protection circuit 213 is turned ON to thereby cause the level of port 213a to rise to a high level. On the other hand, if the level of the output port P00 of the lens CPU 211 falls to a low level when the control port P01 of the lens CPU 211 is at a high level, the field effect transistor (FET) of the second I/O protection circuit 213 is turned ON while the transistor of the second I/O protection circuit 213 is turned OFF to thereby cause the level of port 213a to fall to a low level. Therefore, when the output port P00 of the lens CPU 211 is at a high level, the level of the output port P00 of the lens CPU 211 is output from the second I/O protection circuit 213 via port 213a to be input to the sixth contact 204f (Fmax2/Inverse-FLB).

Because each of the field effect transistor (FET) and the transistor of the second I/O protection circuit 213 is OFF when the control port P01 is at a low level, port 213a is in a high impedance state regardless of the level of the output port P00 of the lens CPU 211.

The power contact 205 (VPZ) is connected to the power port VCC of the lens CPU 211 via a regulator 243. The lens CPU 211 operates with constant voltage supplied from the regulator 243 to the power port VCC.

Selection between the communication channel for communication of the body CPU 111 with the lens ROM 221 (i.e., lens ROM communication/old-type communication) and the communication channel for communication of the body CPU 111 with the lens CPU 211 (i.e., new-type communication) depends on a reset signal input to the third contact 204c (Fmin3/RESL). If the level of the input port RES of the lens ROM 221 rises to a high level, the lens ROM 221 enters a disabled state and the SIO port of the lens ROM 221 enters a high impedance state. This makes the aforementioned new-type lens communication between the body CPU 111 and the lens CPU 211 possible.

The first contact 204a (Fmin1/Inverse-SCKL), the second contact 204b (Fmin2/DATAL), the third contact 204c (Fmin3/RESL), the fifth contact 204e (Fmax1/Inverse-FBL) and the sixth contact 204f (Fmax2/Inverse-FLB) maintain compatibility with conventional camera systems using interchangeable lenses in which serial communication between camera body and interchangeable lens is performed without using a ROM (lens ROM) provided in an interchangeable lens. For instance, in order to maintain compatibility with a camera body which can obtain the minimum f-number and the maximum f-number from the photographing lens mounted to the camera body, diodes for making the first, second, third, fifth and sixth contacts 204a, 204b, 204c, 204e and 204f serve as aperture information contacts so that the camera body can input data on the minimum f-number (the f-number at maximum aperture) via the first, second and third contacts 204a, 204b and 204c and so that the camera body can input data on the maximum f-number (the f-number at minimum aperture) via the fifth and sixth contacts 204e and 204f are selectively provided in a manner such that the camera body can distinguish between the maximum f-number and the minimum f-number by checking continuity of each contact via the diodes.

Figure 4:
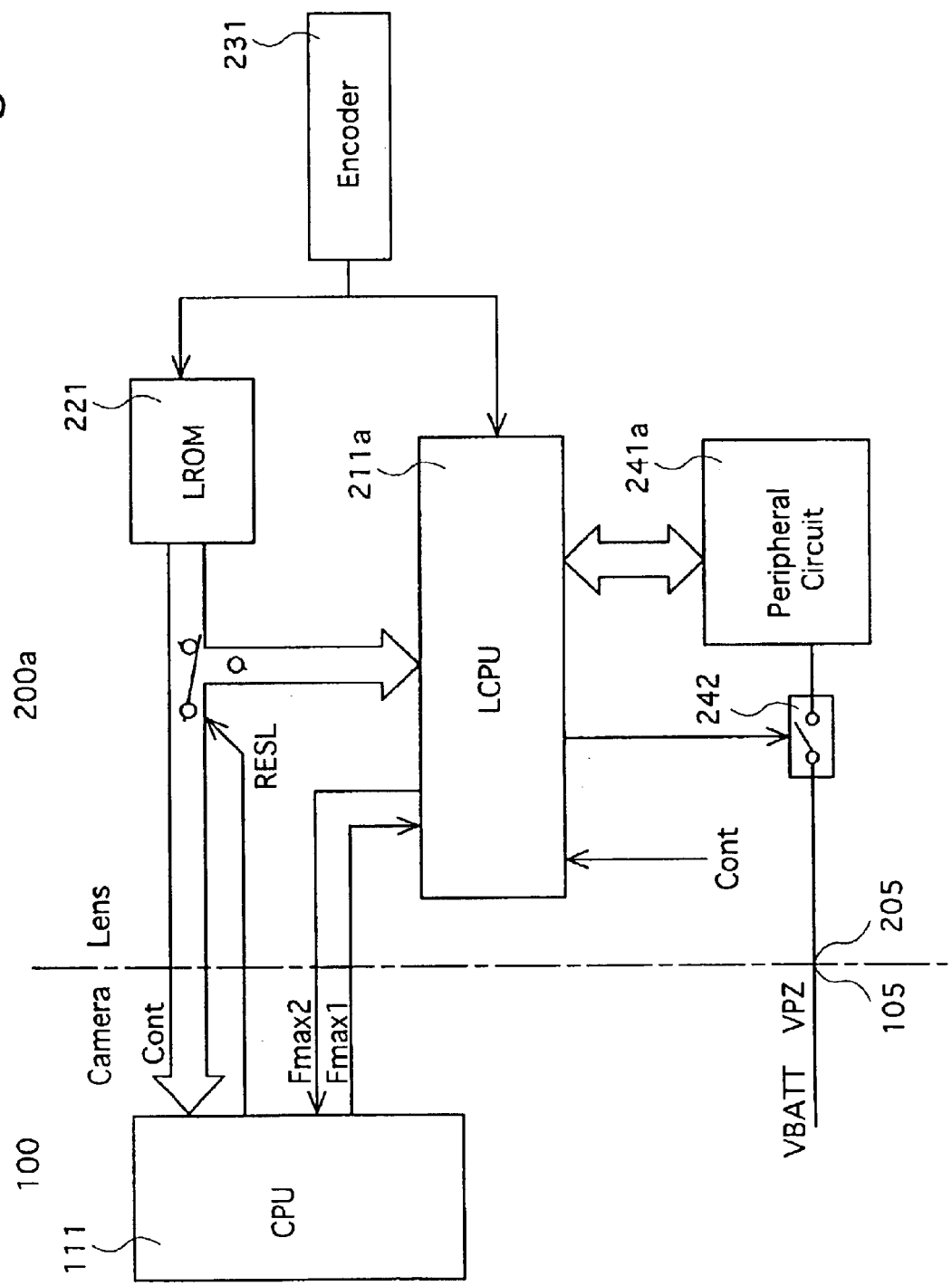
FIG. 4 is a block diagram of fundamental components of a photographing lens which is provided with a lens controller which operates with a first power, and a peripheral circuit which operates with a second power.

FIG. 4 is a block diagram of fundamental components of a photographing lens 200a which is provided with a lens CPU 211a and a peripheral circuit 241a. The lens CPU 211a operates with the first power supplied from the fourth contact 204d (CONTL), while the peripheral circuit 241a operates with power supplied from the power contacts 105 and 205 (VPZ). In the photographing lens 200a shown in FIG. 4, the power supplied from the power contacts 105 and 205 (VPZ) is supplied to the peripheral circuit 241a via the switching circuit 242.

FIG. 5 is a block diagram of fundamental components of a photographing lens 200b which is provided with a lens CPU 211b and a peripheral circuit 241b. The lens CPU 211b operates with the first power supplied from the fourth contact 204d (CONTL). The photographing lens 200b shown in FIG. 5 is not provided with either a power contact or a regulator corresponding to the power contact 205 (VPZ) or the regulator 243, respectively. Each of the lens CPU 211b and the peripheral circuit 241b operates with the first power supplied from the fourth contact 204d (CONTL).

In the photographing lens 200a shown in FIG. 4, the camera body 100 supplies the first power and the second power to the fourth contacts 104d and 204d (CONTL) and the power contacts 105 and 205 (VPZ), respectively. On the other hand, in the photographing lens 200b shown in FIG. 5, the camera body 100 supplies only the first power to the fourth contacts 104d and 204d (CONTL).

Figure 6A:
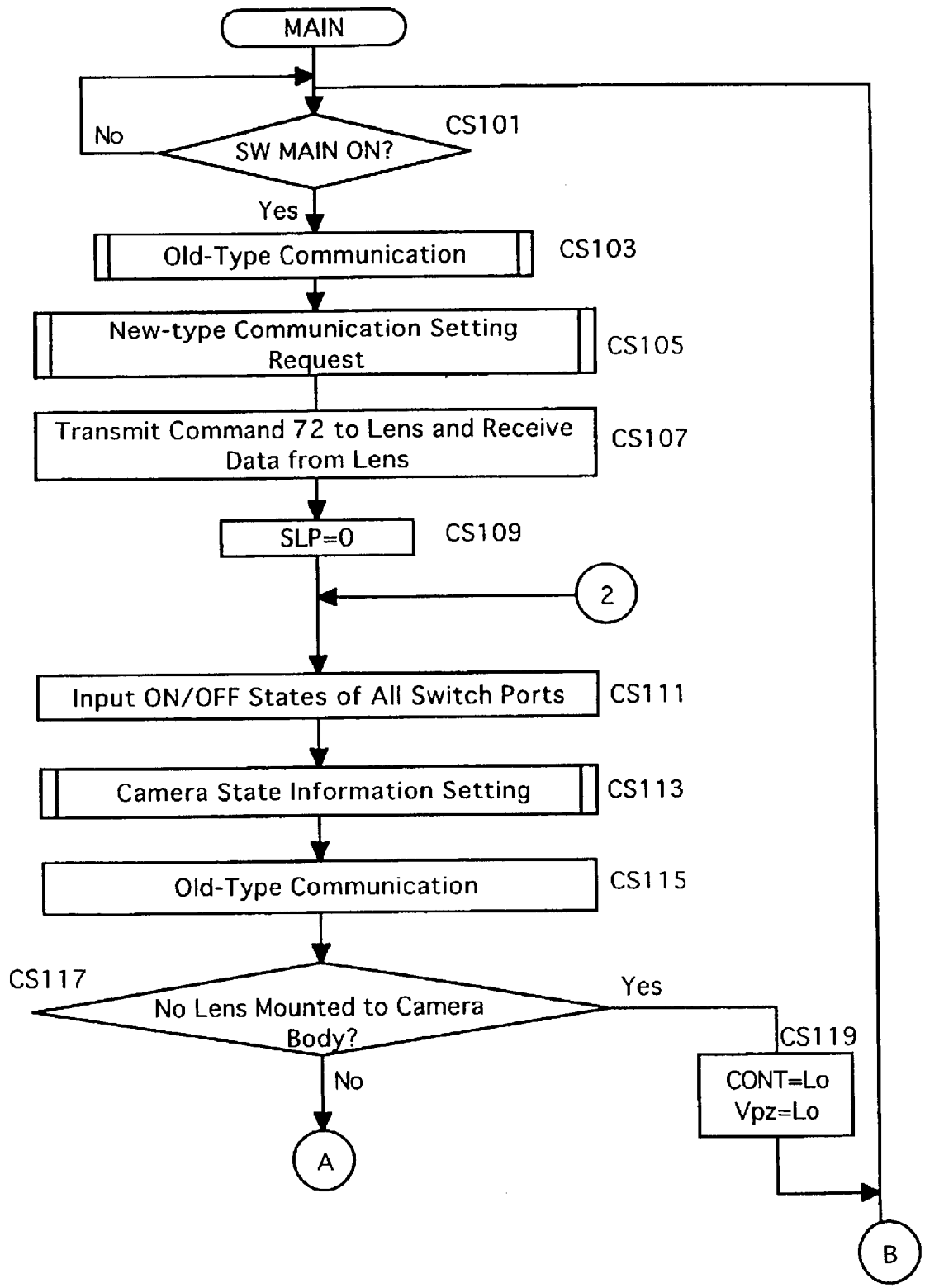
FIGS. 6A and 6B show a flow charts for the first portion of a main process of the camera body, to which the present invention is applied.
Figure 6B:
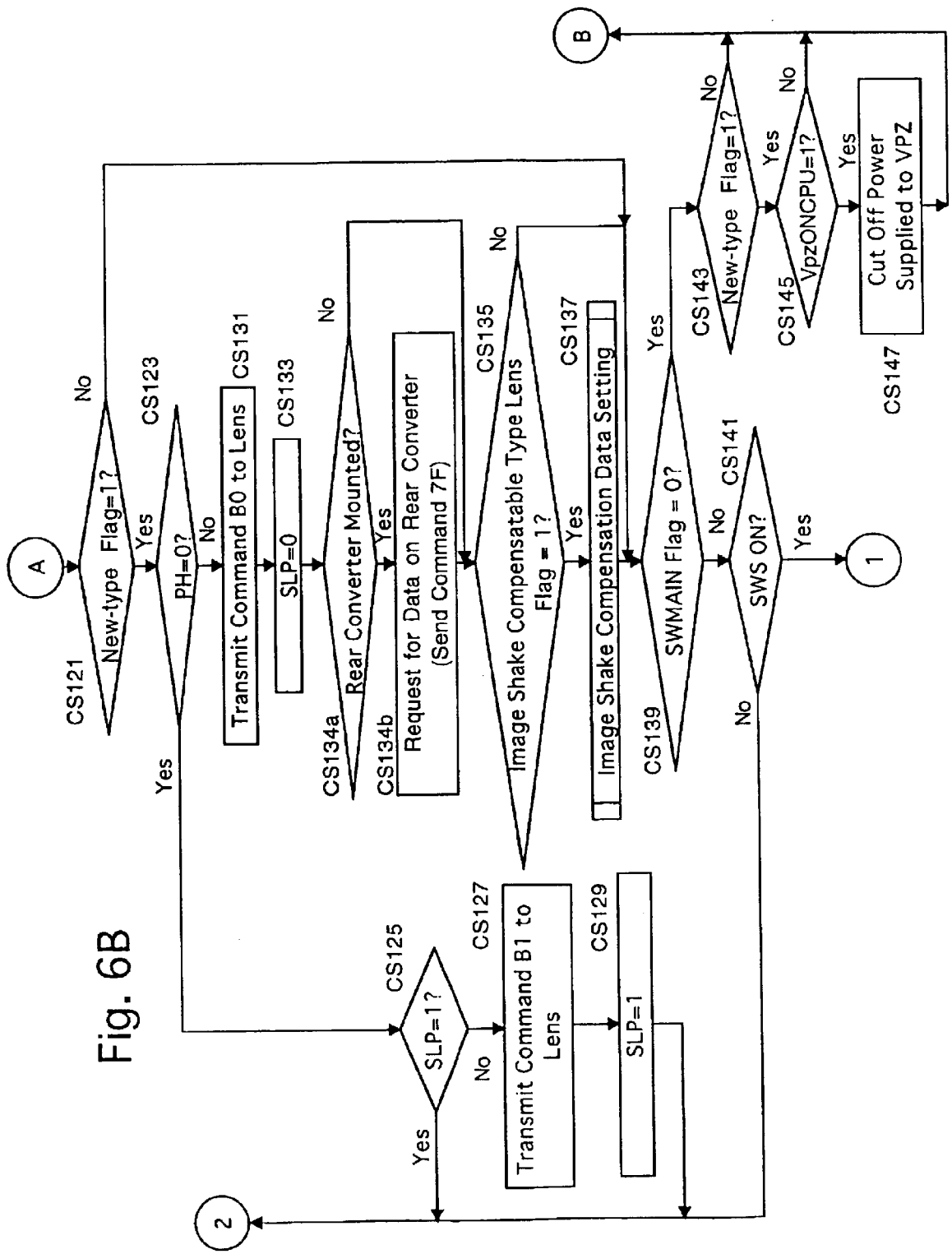

Fundamental operations of the camera body 100 and the photographing lens 200 will be hereinafter discussed in detail with reference to the flow charts shown in FIGS. 6 through 11 and the timing charts shown in FIGS. 18 through 21B. FIG. 6 shows a flow chart for the main process of the camera body 100 which is performed by the body CPU 111. Control enters the main process immediately after the battery 113 is loaded into the camera body 100. The camera body 100 performs both old-type communication (lens ROM communication) and new-type communication between the camera body 100 and the photographing lens 200, whereas the camera body 100 performs only the old-type communication (lens ROM communication) between the camera body 100 and the photographing lens 200 if the photographing lens 200 is of any other type which is not provided with any CPU corresponding to the lens CPU 211 of the photographing lens 200 but provided with only a lens ROM, and which accordingly does not have any communication capability of the photographing lens 200. It should be noted that operations or processes having step numbers bearing a prefix "CS" are related to control/operation of the camera body 100 and that operations or processes having step numbers bearing a prefix "LS" are related to control/operation of the photographing lens 200.

Fundamental commands for discussion of the present embodiment of the SLR camera system are listed below. All the commands listed below are those which are transmitted from the camera body 100 to the photographing lens 200.

Commands Transmitted from Camera Body to Lens in Order to Command Lens to Transmit Data to Camera Body 70: Command for making the photographing lens send a lens status thereof to the camera body.

71: Command for making the photographing lens send a lens status thereof to the camera body and for making the lens CPU enter a sleep mode together with the body CPU.

72: Command for making the photographing lens send information on functions that the photographing lens possesses, such as an image-shake compensation function and a lens autofocus function, to the camera body.

7F: Command for a rear converter.

Commands for Data Transmission from Camera Body to Lens

B0: Command for sending data to the photographing lens.

B1: Command for sending data to the photographing lens and for making the lens CPU enter a sleep mode.

B2: Command for sending data on a driving-amount for the AF motor provided in the photographing lens to the photographing lens.

Instruction Commands Transmitted from Camera Body to Lens

D0: Command for making the lens CPU enter the sleep mode.

D1: Command for turning OFF an image-shake compensation function.

D2: Command for turning ON the image-shake compensation function.

D3: Command for stopping the driving of the AF motor provided in the photographing lens.

D4: Command for resuming the driving of the AF motor provided in the photographing lens.

Figure 18:
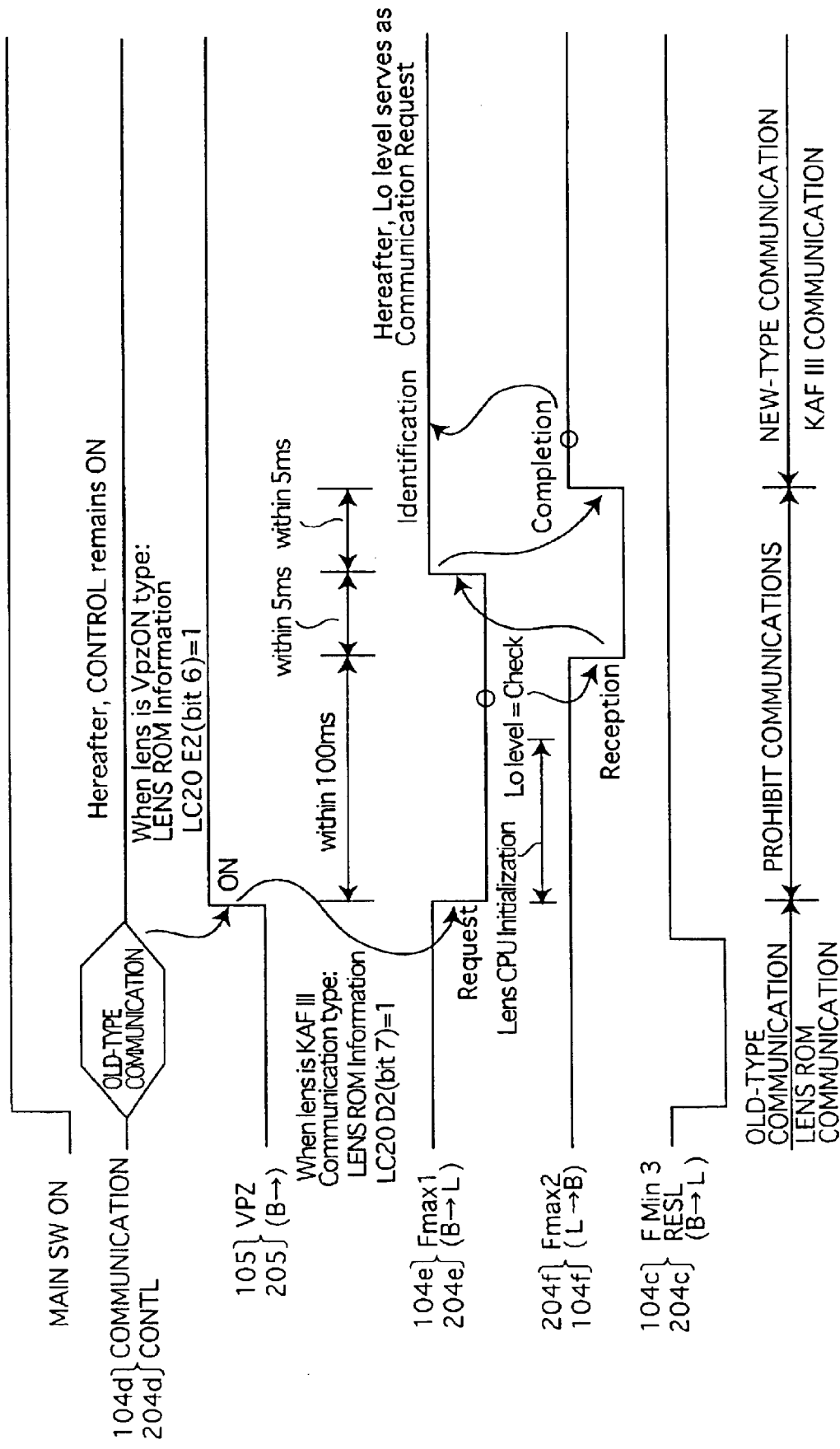
FIG. 18 is a timing chart for the communication identification process from the moment the main switch of the camera body is turned ON to the moment immediately after the commencement of the new-type communication process.

In the main process shown in FIG. 6, firstly it is determined whether the main switch SWMAIN is ON (step CS101). The operation at step CS101 is repeated until the main switch SWMAIN is turned ON. If the main switch SWMAIN is turned ON (if YES at step CS101), a communication identification process (i.e., an old-type communication process at step CS103 and a new-type communication setting request process at step CS105) is performed. Command 72 is transmitted to the photographing lens to receive data therefrom (step CS107). Command 72 commands the lens CPU 211 to output information on the functions that the photographing lens possesses to the body CPU 111. The functions of the photographing lens can include, e.g., an image-shake compensation function, a lens autofocus function and other functions which operate with power (the second power) supplied from the power contacts VPZ. In the present embodiment of the SLR camera system, such information on functions that the photographing lens has is represented by 1-byte data (8-bit data), wherein the sixth bit represents the presence or absence of the autofocus function while the fourth bit represents the present or absence of the image-shake compensation function. Upon receiving command 72, the lens CPU 211 of the (new-type) photographing lens 200 outputs information on functions that the photographing lens 200 possesses to the body CPU 111. FIG. 18 shows a timing chart for the aforementioned communication identification process from the moment the main switch SWMAIN is turned ON to the moment immediately after the commencement of the new-type communication process. FIG. 19A and 19B each show a timing chart for a handshake operation performed between the camera body 100 and the photographing lens 200 at the commencement of the communication process. FIG. 20 shows a timing chart for the old-type communication process. FIGS. 21A and 21B show timing charts for the new-type communication process.

After the operation at step CS107, the body CPU 111 sets a lens sleep flag SLP to "0" (step CS109). The lens sleep flag SLP "1" or "0" indicates that the lens CPU 211 is in the sleep mode (low power operation mode) or not in the sleep mode, respectively. The operations or processes at steps CS103 through CS109 are performed when the main switch SWMAIN is turned from OFF to ON. Thereafter, the operations at and after step CS111 are repeated.

At step CS111, ON/OFF states of all the switch ports are input. Subsequently, a camera state information setting process is performed (step CS113). In the camera state information setting process, the information on the current states of some specific switches and a flash charging system which is to be transmitted to the lens CPU 211 via the new-type communication is prepared. Subsequently, the old-type communication process is performed (step CS115), and it is determined whether a photographing lens is mounted to the camera body 100 (step CS117). If no photographing lens is mounted (if YES at step CS117), each of the fourth contact 104d (CONTL) and the power contact 105 (VPZ) is set to a low level (step CS119), and control returns to step CS101. If it is determined at step CS117 that a photographing lens is mounted (if NO at step CS117), it is determined whether a new-type flag is "1", i.e., whether the photographing lens currently mounted to the camera body 100 is the (new-type) photographing lens 200 (step CS121). The new-type flag "1" indicates that the photographing lens currently mounted to the camera body 100 is the (new-type) photographing lens 200. If the new-type flag is "1" (if YES at step CS121), it is determined whether a power hold flag PH is "0", i.e., whether the camera body 100 is not in a power hold state (step CS123). If the power hold flag PH is "0" (if YES at step CS123), it is determined whether the lens sleep flag SLP is "1" (step CS125). If the lens sleep flag SLP is "1" (if YES at step CS125), control returns to step CS111 since the photographing lens 200 is already in a sleep mode. If it is determined at step CS125 the lens sleep flag SLP is not "1", command B1 is transmitted to the lens CPU 211 to make the photographing lens 200 enter the sleep mode (step CS127). Subsequently, the lens sleep flag SLP is set to "1" (step CS129), and control returns to step CS111.

If it is determined at step CS123 that the power hold flag PH is not "0" (if NO at step CS123), command B0 is transmitted to the lens CPU 211 to start the lens CPU 211 (step CS131), and the lens sleep flag SLP is set to "0" (step CS133). Subsequently, it is determined whether a rear converter is mountfixed between the camera body and the photographing lens viafrom the result of the old-type communication process at step CS115 (step CS134a). If a rear converter is mounted between the camera body and the photographing lens (if YES at step CS134a) command 7F, which commands the rear converter to send information thereon to the camera body, is transmitted to the camera body 100 (step CS134b), and control proceeds to step CS135. If no rear converter is mounted between the camera body and the photographing lens (if NO at step CS134a), control proceeds straight from step CS134a to step CS135. At step CS135 it is determined whether an image-shake compensating type lens flag is "1", i.e., whether photographing lens 200 mounted to the camera body 100 is provided with an image shake compensation device. If the image-shake compensating type lens flag is "1" (if YES at step CS135), an image-shake compensation data setting process, in which predetermined flags and data on image-shake compensation are set, is performed (step CS137), and control proceeds to step CS139. If the image-shake compensating type lens flag is not "1" (if NO at step CS135), control skips step CS137 to proceed straight from step CS135 to step CS139. If it is determined at step CS121 that the new-type flag is not "1", control proceeds straight from step CS121 to step CS139. At step CS139 it is determined whether a SWMAIN flag is "0", i.e., whether the main switch SWMAIN has been turned from ON to OFF. If it is determined at step CS139 that the SWMAIN flag is not "1" (if NO at step CS139), it is determined whether the photometering switch SWS is ON (step CS141). If the photometering switch SWS is not ON (if NO at step CS141), control returns to step CS111. If the photometering switch SWS is ON (if YES at step CS141), control proceeds to step CS151. If it is determined at step CS139 that the SWMAIN flag is "1", it is determined whether the new-type flag is"1" (step CS143). If it is determined at step CS143 that the new-type flag is not "1", control returns to step CS101. If it is determined at step CS143 that the new-type flag is "1" ( i.e., that the (new-type) photographing lens 200 is currently mounted to the camera body 100), it is determined at step CS145 whether a second power flag VpzONCPU is "1", i.e., whether the photographing lens 200 mounted to the camera body 100 is of a type which operates with power supplied from the power contact 105 (VPZ). If it is determined at step CS145 that the second power flag VpzONCPU is "1" (if YES at step CS145), the port VPZ is turned OFF, i.e., power supplied to the power contact 105 (VPZ) is cut off (step CS147), and control returns to step CS101. If it is determined at step CS145 that the second power flag VpzONCPU is not "1" (if NO at step CS145), control returns to step CS101 since the photographing lens mounted to the camera body 100 does not operate with power supplied from the power contact 105 (VPZ).

Figure 7:
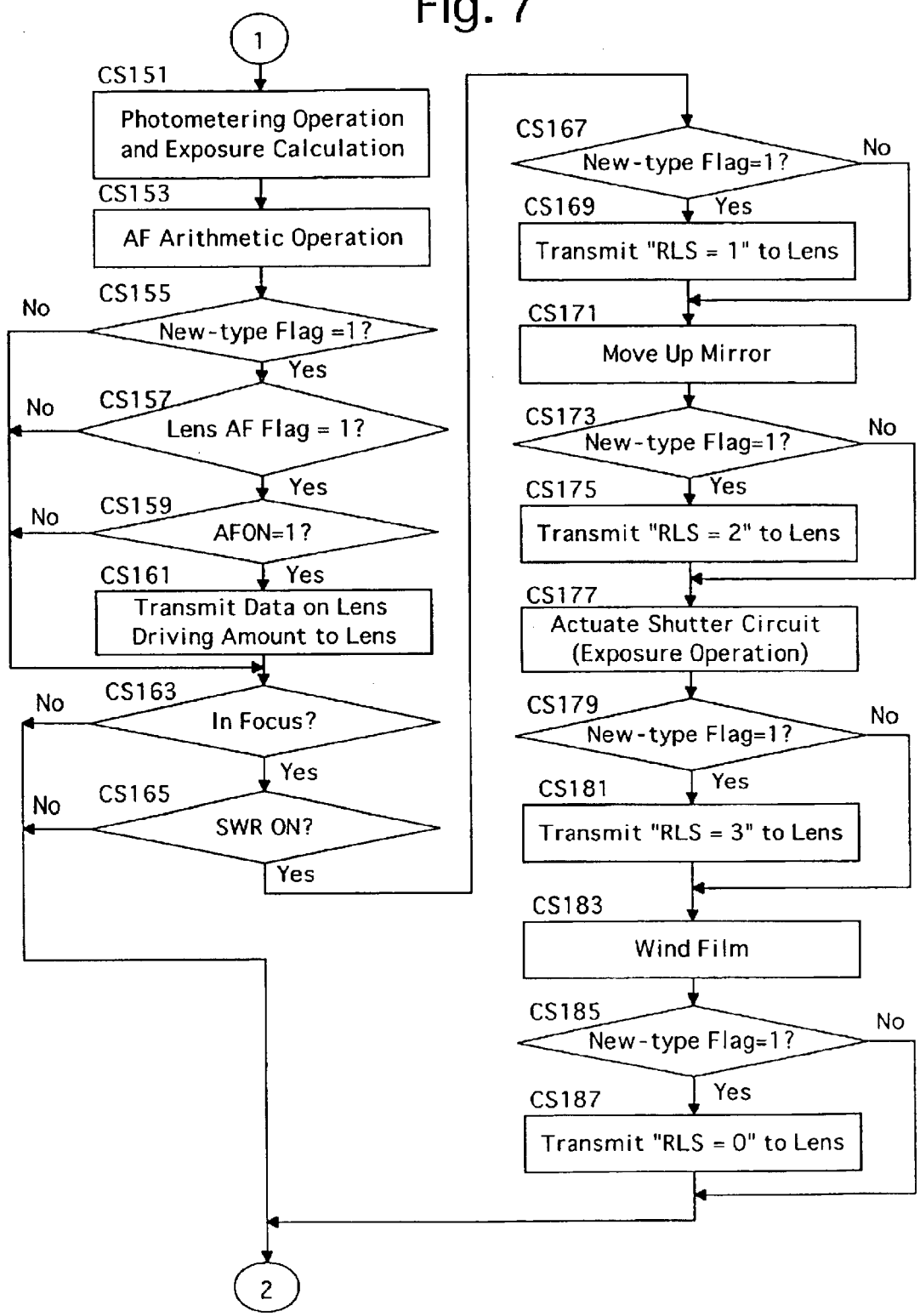
FIG. 7 is a flow chart for the remaining portion of the main process of the camera body, to which the present invention is applied.

Operations which are performed after it is determined at step CS141 that the photometering switch SWS is ON will be hereinafter discussed with reference to the flow chart shown in FIG. 7.

If it is determined at step CS141 that the photometering switch SWS is ON (if YES at step CS141), a photometering operation in which photometric data is input from a photometering sensor and an exposure arithmetic operation are performed in accordance with a currently-selected photometering mode and a currently-selected exposure mode, respectively (step CS151). Subsequently, AF sensor data is input from an AF sensor in accordance with a currently-selected AF mode, while a predetermined AF arithmetic operation necessary for attaining an in-focus state is performed in accordance with the input AF sensor data (step CS153).

Subsequently, it is determined whether the new-type flag is "1" (step CS155). If the new-type flag is "1" (if YES at step CS155), it is determined whether a lens AF flag is "1", i.e., whether the photographing lens 200 mounted to the camera body 100 has a lens autofocus function (step CS157). If the lens AF flag is "1" (if YES at step CS157), it is determined whether an AFON flag is "1" (step CS159). The AFON flag "1" indicates that the AF function is ON, i.e., the AF function is in operation. If the AFON flag is "1" (if YES at step CS159), data on a driving-amount of an AF lens (focusing lens group) of the photographing lens is transmitted to the lens CPU 211 (step CS161), and subsequently control proceeds to step CS163. If at least one of the new-type flag, the lens AF flag and the AFON flag is not "1", control skips the operation at step CS161 and proceeds to step CS163.

At step CS163 it is determined whether an in-focus state has been obtained. If an in-focus state has not been obtained (if NO at step CS163), control returns to step CS111 shown in FIG. 6. Accordingly, in the present embodiment of the SLR camera system, an in-focus priority control in which the shutter cannot be released unless an in-focus state is obtained is adopted. A release priority control in which the shutter can be released even in an out-of-focus state can be adopted. In this case, the operation at step CS163 is omitted.

If it is determined at step CS163 that an in-focus state has been obtained (if YES at step CS163), it is determined whether the release switch SWR is ON (step CS165). If the release switch SWR is OFF (if NO at step CS165), control returns to step CS111.

If the release switch SWR is ON (if YES at step CS165), it is determined whether the new-type flag is 1 (step CS167). If the new-type flag is 1 (if YES at step CS167), a release stage indicator RLS is set to "1", and information on the indicator RLS "1" is transmitted to the lens CPU 211 (step CS169). Subsequently control proceeds to step CS171. If the new-type flag is not 1 (if NO at step CS167), control skips step CS169 to proceed straight from step CS167 to step CS171, so that the information on the indicator RLS "1" is not transmitted to the lens CPU 211. The release stage indicator RLS "1" informs the photographing lens 200 of a stage at which the quick return mirror is moving toward the retracted position thereof after the release switch SWR has been turned ON.

At step CS171 the mirror circuit 123 is actuated to drive a mirror drive motor so that the quick return mirror of the camera body 100 moves up to a retracted position. Subsequently, it is determined whether the new-type flag is 1 (step CS173). If the new-type flag is 1 (if YES at step CS173), the release stage indicator RLS is set to "2", and information on the stage indicator RLS "2", is transmitted to the lens CPU 211 (step CS175). Subsequently, control proceeds to step CS177. If the new-type flag is not 1 (if NO at step CS173), control skips step CS175 to proceed straight from step CS173 to step CS177, so that the information on the indicator RLS "2" is not transmitted to the lens CPU 211. The release stage indicator RLS "2" informs the photographing lens 200 of a stage at which a film frame is under exposure after the quick return mirror has moved up to the retracted position thereof.

At step CS177 the shutter circuit 125 is actuated to drive the focal plane shutter mechanism to perform an exposure operation. Upon completion of the exposure operation, it is determined whether the new-type flag is 1 (step CS179). If the new-type flag is 1 (if YES at step CS179), the release stage indicator RLS is set to "3", and information on this indicator RLS "3" is transmitted to the lens CPU 211 (step CS181). Subsequently control proceeds to step CS183. If the new-type flag is not 1 (if NO at step CS179), control skips step CS181 to proceed straight from step CS179 to step CS183, so that the information on the indicator RLS "3" is not transmitted to the lens CPU 211. The release stage indicator RLS "3" informs the photographing lens 200 of a stage at which film is wound after the exposure operation has been completed.

At step CS183 a film-winding operation in which the film-winding circuit 127 is actuated to drive a film motor (shutter charge motor) to wind film by one frame is performed while a shutter charge operation is performed (step CS183). Subsequently, it is determined whether the new-type flag is "1" (step CS185). If the new-type flag is 1 (if YES at step CS185), the release stage indicator RLS is set to "0", and information on this indicator RLS "0" is transmitted to the lens CPU 211 (step CS187). Subsequently control returns to step CS111. If the new-type flag is not 1 (if NO at step CS185), control skips step CS187 to return straight from step CS185 to step CS111, so that the information on the indicator RLS "0" is not transmitted to the lens CPU 211. The release stage indicator RLS "0" informs the photographing lens of a stage at which the aforementioned film-winding operation has been completed, i.e., a state at which the shutter can be released.

In the above described release process at and after step CS151, the release stage indicator RLS that indicates a stage in the release process is transmitted to the lens CPU 211 each time each stage in the release process is completed, if the (new-type) photographing lens 200 is mounted to the camera body 100. This makes it possible for the photographing lens 200 to perform operations which correspond to operational state and stage of the camera body 100.

Figure 8A:
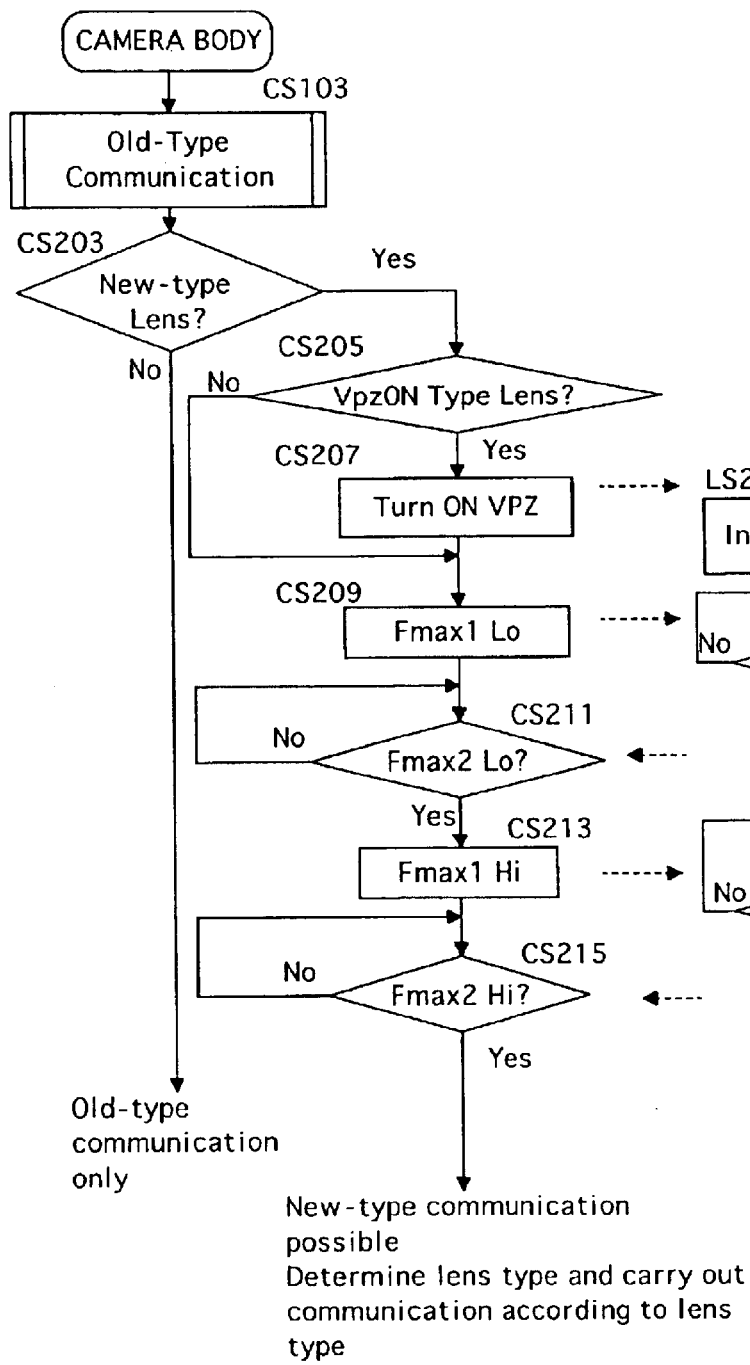
FIG. 8A is a flow chart for a communication identification process including of an old-type communication process and a new-type communication setting request process of the camera body.
Figure 8B:
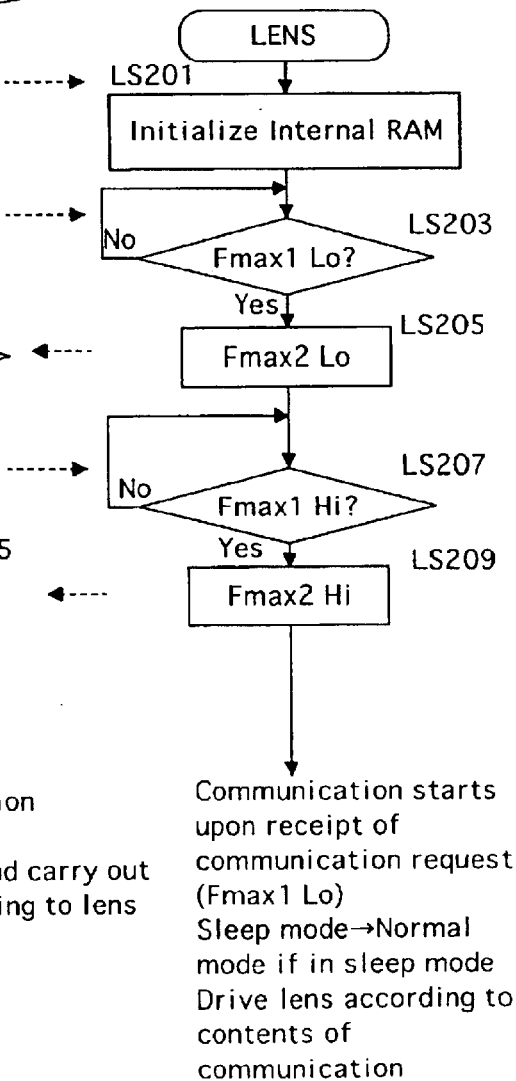
FIG. 8B is a flow chart for operations of a photographing lens which are performed in accordance with operations of the new-type communication setting request process of the camera body.

The communication identification process, which is composed of the old-type communication process at step CS103 and the new-type communication setting request process at step CS105, will be hereinafter discussed in detail with reference to the flow charts shown in FIGS. 8A and 8B. FIG. 8A shows operations of the communication identification process, while FIG. 8B shows operations of the photographing lens 200 which are performed by the lens CPU 211 in accordance with operations of the new-type communication setting request process at step CS105. The new-type communication setting request process at step CS105 includes operations at steps CS203 through CS215 shown in FIG. 8A.

Control enters the communication identification process immediately after the power of the camera body 100 is turned ON. The communication identification process is performed to identify the type of photographing lens 200 and communication protocols used therefor. Immediately after the power of the camera body 100 is turned ON (i.e., immediately after it is determined that the main switch SWMAIN is ON at step CS101), control enters the old-type communication process at step CS103. In the old-type communication process at step CS103, it is determined whether the photographing lens currently mounted to the camera body 100 is provided with a lens ROM from which the body CPU 111 can read out any predetermined lens data, and subsequently the old-type communication (lens ROM communication) is performed in accordance with communication protocols used for the photographing lens having such a lens ROM, if it is determined that the photographing lens currently mounted to the camera body 100 is provided with such a lens ROM. In the lens ROM communication, predetermined lens data written in the lens ROM 221 are read therefrom. This lens data includes data on the lens type of the currently mounted photographing lens.

Upon completion of the lens ROM communication, it is determined, from the result of the lens ROM communication, whether the photographing lens 200 currently mounted to the camera body 100 is a new type of photographing lens (step CS203). If it is determined that a new type of photographing lens is not mounted to the camera body 100 (if NO at step CS203), control exits the communication identification process, and from this time on only the old-type communication (lens ROM communication) is performed between the photographing lens 200 and the camera body 100.

If it is determined at step CS203 that the photographing lens 200 mounted to the camera body 100 is new type of photographing lens (if YES at step CS203), it is determined whether the currently-mounted (new-type) photographing lens 200 is of a type (VpzON type) which operates with power supplied from the power contact 105 (VPZ) (step CS205). If the currently-mounted photographing lens 200 is a VpzON type lens (if YES at step CS205), the power contact 105 (VPZ) is turned ON; namely, power is supplied to the power contact 105 (VPZ) (step CS207). Subsequently, control proceeds to step CS209. On the other hand, if the currently-mounted photographing lens 200 is not a VpzON type lens (if NO at step CS205), control skips step CS207 to proceed straight from step CS205 to step CS209, so that no power is supplied to the power contact 105 (VPZ).

At step CS209 the level of the fifth contact 104e (Fmax1/Inverse-FBL) is made to fall to a low level ("Lo" or "L" level), and subsequently it is determined whether the level of the sixth contact 104f (Fmax2/Inverse-FLB) is a low level (step CS211). The operation at step CS211 is repeated as long as the level of the sixth contact 104f (Fmax2/Inverse-FLB) is a high level. If it is determined at step CS211 that the level of the sixth contact 104f (Fmax2/Inverse-FLB) is a low level (if YES at step CS211), the level of the fifth contact 104e (Fmax1/Inverse-FBL) is raised to a high level ("Hi" or "H" level) (step CS213), and subsequently it is determined whether the level of the sixth contact 104f (Fmax2/Inverse-FLB) is a high level (step CS215). The operation at step CS215 is repeated as long as the level of the sixth contact 104f (Fmax2/Inverse-FLB) is a low level. If it is determined at step CS215 that the level of the sixth contact 104f (Fmax2/Inverse-FLB) is a high level (if YES at step CS215), this means that the (new type of) photographing lens 200 mounted to the camera body 100 operates normally, so that control comes out of the communication identification process, and from this time on new-type communication is performed between the photographing lens 200 (the lens CPU 211) and the camera body 100 (the body CPU 111).

On the other hand, while the camera body 100 performs the operations at steps CS207 through CS215, the (new-type) photographing lens 200 performs the operations represented by the flow chart shown in FIG. 8B. If the power contact 105 (VPZ) is supplied with power at step CS207, this power is supplied to the photographing lens 200 via the power contact 205 (VPZ). This causes the regulator 243 to supply a constant voltage to the lens CPU 211, which in turn causes the lens CPU 211 to initialize internal RAM thereof (step LS201). Subsequently, it is determined whether the level of the fifth contact 204e (Fmax1/Inverse-FBL) is a low level (step LS203). The operation at step LS203 is repeated long as the level of the fifth contact 204e (Fmax1/Inverse-FBL) is a high level. If it is determined, via the fifth contact 204e (Fmax1/Inverse-FBL) and the port INT of the lens CPU 211, that the level of the fifth contact 104e (Fmax1/Inverse-FBL) falls to a low level due to the operation at step CS209 (if YES at step LS203), the level of the sixth contact 204f (Fmax2/Inverse-FLB) is made to fall to a low level via the port P00 of the lens CPU 211 (step LS205). Thereafter, it is determined whether the level of the fifth contact 204e (Fmax1/Inverse-FBL) is a high level (step LS207). The operation at step LS207 is repeated as long as the level of the fifth contact 204e (Fmax1/Inverse-FBL) is a low level. If it is determined that the level of the fifth contact 104e (Fmax1/Inverse-FBL) rises to a high level due to the operation at step CS213 (if YES at step LS207), the level of the sixth contact 204f (Fmax2/Inverse-FLB) is raised to a high level (step LS209). Subsequently, control comes out of the communication identification process, and from this time on the new-type communication is performed between the (new-type) photographing lens 200 (the lens CPU 211) and the camera body 100 (the body CPU 111).

FIG. 18 shows a timing chart for the communication identification process that is performed between the body CPU 111 of the camera body 100 and the lens CPU 211 of the photographing lens 200. In the communication identification process, the fifth contacts 104e and 204e (Fmax1/Inverse-FBL) and the sixth contacts 104f and 204f (Fmax2/Inverse-FLB) are used to serve as handshake connectors/lines (see FIGS. 19A and 19B). Immediately after the power of the camera body 100 is turned ON, the body CPU 111 makes the level of the fourth contact 204d (CONTL) rise to a high level to perform the old-type communication (lens ROM communication).

Old-type Communication (Lens ROM Communication)

FIG. 20 shows a timing chart for the old-type communication process between the camera body 100 and the photographing lens 200, i.e., between the body CPU 111 and the lens ROM 221. In the lens ROM communication, predetermined lens data written in the lens ROM 221 are read therefrom. The levels of the first contact 104a (Fmin1/Inverse-SCKL), the third contact 104c (Fmin3/RESL) and the fourth contact 104d (CONTL) of the group of communication/control contacts 104 of the camera body 100 before the commencement of the lens ROM communication are a high level, a high level and a low level, respectively. The second contact 104b (Fmin2/DATAL) before the commencement of the lens ROM communication is in a high impedance (floating) state.

The body CPU 111 makes the level of the fourth contact 104d (CONTL) rise to a high level to actuate the lens ROM 221 when starting the lens ROM communication. Subsequently, after waiting a predetermined period of time necessary for the lens ROM to operate with stability, the body CPU 111 makes the level of the third contact 104c (Fmin3/RESL) fall to a low level to change a state of the lens ROM 221 from a disabled state to an enabled state. Thereafter, if the body CPU 111 outputs a clock signal from the first contact 104a (Fmin1/Inverse-SCKL), the lens ROM 221 reads out predetermined data from an internal ROM thereof to output the predetermined data to the second contact 204b (Fmin2/DATAL), so that the body CPU 111 inputs the predetermined data via the second contact 104b (Fmin2/DATAL). The body CPU 111 makes the level of the third contact 104c (Fmin3/RESL) rise to a high level upon having input a predetermined number of bytes of lens data. In the present embodiment of the SLR camera system, the last few bytes of the lens data are spare bytes. For example, these spare bytes can receive data output from a ROM provided in the rear converter when a rear converter is fixed between the camera body and the photographing lens.

Information on the lens type is included in data obtained via the above described lens ROM communication, and includes data (new-type lens bit="1") for identification of the new-type photographing lens (i.e., a lens which can perform the new-type communication) and data (VpzONCPU bit="1") for identification of the necessity for power supply. The body CPU 111 of the camera body 100 identifies whether or not the photographing lens 200 mounted to the camera body 100 is a new type of photographing lens from such data.

New-type Communication

Upon completion of the old-type communication, the body CPU 111 starts supplying power to the power contacts 105 and 205 (VPZ). Subsequently, the body CPU 111 makes the level of the fifth contact 104e (204e) (Fmax1/Inverse-FBL) fall to a low level to interrupt the lens CPU 211, and waits for the level of the sixth contact 104f (204f) (Fmax2/Inverse-FLB) to fall to a low level, i.e., waits for the lens CPU 211 to make the level of the sixth contact 204f (Fmax2/Inverse-FLB) fall to a low level. The fifth contact 104e (204e) (Fmax1/Inverse-FBL), the sixth contact 104f (204f) (Fmax2/Inverse-FLB), and the second contact 104b (204b) (Fmin2/DATAL) correspond to a first communication/control contact, a second communication/control contact and an data I/O contact, respectively.

Upon the interrupt by the body CPU 111, the lens CPU 211 "wakes up" and operates normally if in the sleep mode, and initializes the internal RAM thereof. Subsequently, upon completion of the initializing operation, the lens CPU 211 makes the level of the sixth contact 204f (Fmax2/Inverse-FLB) fall to a low level, and waits for the level of the fifth contact 204e (104e) (Fmax1/Inverse-FBL) to rise to a high level.

Immediately after the level of the sixth contact 104f (204f) (Fmax2/Inverse-FLB) falls to a low level, the body CPU 111 makes the level of the fifth contact 104e (204e) (Fmax1/Inverse-FBL) rise to a high level, and waits for the level of the sixth contact 104f (204f) (Fmax2/Inverse-FLB) to rise to a high level.

Immediately after the level of the fifth contact 204e (104e) (Fmax1/Inverse-FBL) rises to a high level, the lens CPU 211 makes the sixth contact 204f (104f) (Fmax2/Inverse-FLB) rise to a high level to complete the communication identification process.

Upon identifying that the level of the sixth contact 104f (204f) (Fmax2/Inverse-FLB) has risen to a high level, the body CPU 111 completes the communication identification process.

From this time on, data and commands are transmitted between the camera body 100 and the photographing lens 200 via the new-type communication.

Figure 10:
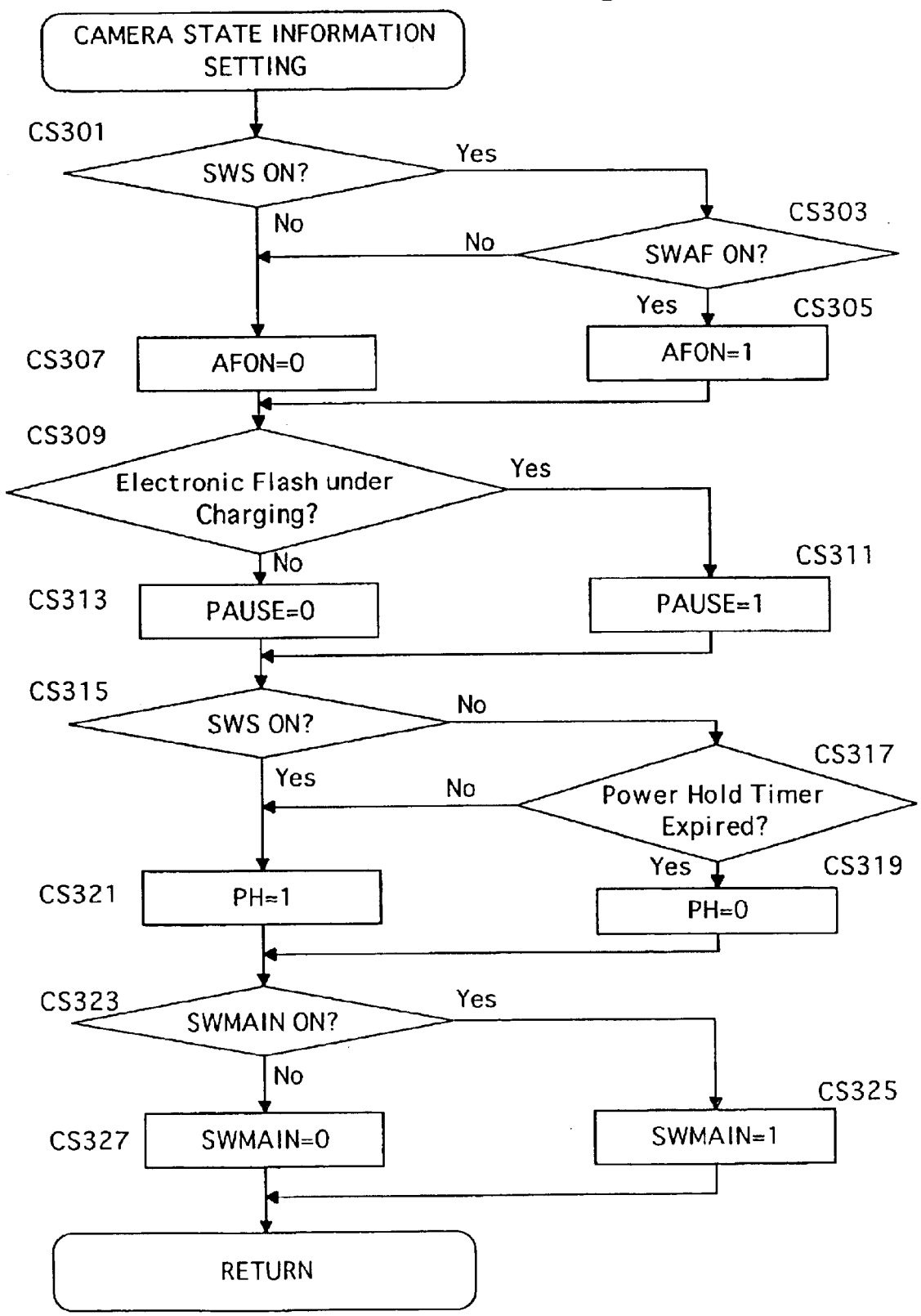
FIG. 10 is a flow chart for a camera state information setting process of the camera body.

The camera state information setting process performed at step CS113 will be hereinafter discussed in detail with reference to the flow chart shown in FIG. 10. In the camera state information setting process, the information on the current states of specific switches and a flash charging system which is to be transmitted to the lens CPU 211 via the new-type communication is prepared. Specifically, in the present embodiment of the SLR camera system, it is determined whether the autofocus system of the camera body 100 is in operation, whether an electronic flash (strobe) is in the middle of charging, whether a power hold timer has expired since the photometering switch SWS is turned OFF, and whether the main switch SWMAIN is ON, wherein flags which indicate these states are set as state information.

In the camera state information setting process, it is determined whether the photometering switch SWS is ON (step CS30). If the photometering switch SWS is ON (if YES at CS301), it is determined whether the AF switch SWAF is ON, i.e., whether the autofocus mode has been set via the AF switch SWAF (step CS303). If the AF switch SWAF is ON (if YES at step CS303), the AFON flag is set to "1" (step CS305) and subsequently control proceeds to step CS309. If the AF switch SWAF is not ON (if NO at step CS303), the AFON flag is set to "0" (step CS307), and subsequently control proceeds to step CS309. If the AF switch SWAF is not ON (if NO at step CS301), the AFON flag is set to "0" (step CS307), and subsequently control proceeds to step CS309.

At step CS309 it is determined whether the electronic flash is in the middle of charging. If the electronic flash is in the middle of charging (if YES at step CS309), a flag PAUSE is set to "1" (step CS311), and subsequently control proceeds to step CS315. The flag PAUSE is set to "1" when any high power operation which requires a large current is performed at present. The electric flash charging operation corresponds to a high power operation in the present embodiment of the SLR camera system. Therefore, the flag PAUSE is set to "1" when the electronic flash is in the middle of charging. When the flag PAUSE is "1", the photographing lens 200 suspends all high power operations thereof. The film-winding operation and the shutter charge operation are also high power operations performed in the present embodiment of the SLR camera system.

At step CS315 it is determined whether the photometering switch SWS is ON. If the photometering switch SWS is ON (if YES at CS315), the power hold flag PH is set to "1" (step CS321), and subsequently control proceeds to step CS323. If the photometering switch SWS is not ON (if NO at CS315), it is determined whether the power hold timer has expired (step CS317). If the power hold timer has expired (if YES at step CS317), the power hold flag PH is set to "0" (step CS319), and subsequently control proceeds to step CS323. If the power hold timer has not expired (if NO at step CS317), the power hold flag PH is set to "1" (step CS321), and subsequently control proceeds to step CS323. The power hold timer measures the time from the moment the photometering switch SWS is turned OFF to the moment the body CPU 111 enters a sleep mode, and the power hold flag PH "1" or "0" indicates that the camera body 100 is in operation or in a sleep mode (a power saving mode), respectively.

At step CS323, it is determined whether the main switch SWMAIN is ON. If the main switch SWMAIN is ON (if YES at step CS323), the SWMAIN flag is set to "1" (step CS325), and subsequently control returns. If the main switch SWMAIN is not ON (if NO at step CS323), the SWMAIN flag is set to "0" (step CS327), and subsequently control returns.

New-type Communication (Lens CPU Communication)

Timing charts in the new-type communication between the lens CPU 211 and the body CPU 111 are shown in FIGS. 18, 19A, 19B, 21A and 21B. In the new-type communication, the fifth contacts 104e and 204e (Fmax1/Inverse-FBL), and the sixth contacts 104f and 204f (Fmax2/Inverse-FLB), are used to serve as handshake connectors/lines (see FIGS. 19A and 19B). The level of each of the fifth contact 104e (Fmax1/Inverse-FBL) and the sixth contact 104f (Fmax2/Inverse-FLB) is pulled up by the body CPU 111 so that the fifth contact 104e (Fmax1/Inverse-FBL) and the sixth contact 104f (Fmax2/Inverse-FLB) cannot short circuit when the new type of photographing lens 200 is mounted to or dismounted from the camera body 100 (see FIGS. 19A and 19B).

New-type Communication Setting Request Process

Figure 9:
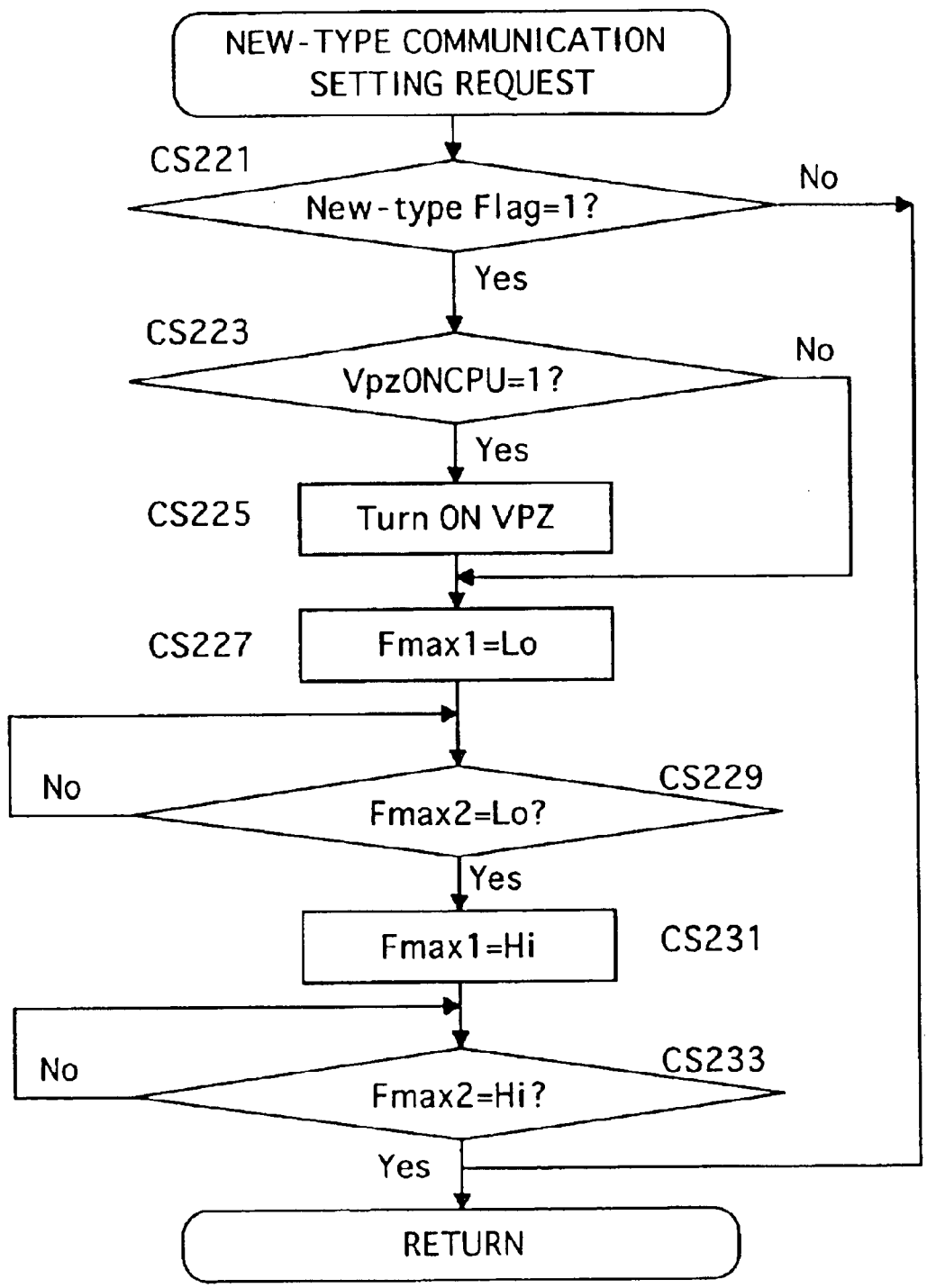
FIG. 9 is a flow chart for the new-type communication setting request process of the camera body.

The new-type communication setting request process performed at step CS105 will be hereinafter discussed in detail with reference to the flow chart shown in FIG. 9.

In the new-type communication setting request process, firstly it is determined whether the new-type flag is "1", i.e., whether the photographing lens 200 currently mounted to the camera body 100 is a new type of photographing lens (step CS221). If the new-type flag is not "1" (if NO at step CS221), control returns since the currently mounted photographing lens 200 is not a new type of photographing lens. If the new-type flag is "1" (if YES at step CS221), operations at and after steps CS223 in the new-type communication setting request process are performed since the photographing lens 200 currently mounted to the camera body 100 is a new type of photographing lens 200 which allows new-type communication.

At step CS223 it is determined whether the second power flag VpzONCPU is "1". If the second power flag VpzON-CPU is "1" (if YES at step CS223), the power contact 105 (VPZ) is turned ON, namely, power is supplied to the power contact 105 (VPZ) (step CS225). Subsequently, control proceeds to step CS227. On the other hand, if the second power flag VpzONCPU is not "1" (if NO at step CS223), control skips step CS225 to proceed straight from step CS221 to step CS225, so that no power is supplied to the power contact 105 (VPZ).

At step CS227, the level of the fifth contact 104e (Fmax1/Inverse-FBL) is made to fall to a low level, and subsequently it is determined whether the level of the sixth contact 104f (Fmax2/Inverse-FLB) is a low level (step CS229). The operation at step CS229 is repeated as long as the level of the sixth contact 104f (Fmax2/Inverse-FLB) is a high level. If it is determined at step CS229 that the level of the sixth contact 104f (Fmax2/Inverse-FLB) is a low level (if YES at step CS229), the level of the fifth contact 104e (Fmax1/Inverse-FBL) is raised to a high level (step CS231), and subsequently it is determined whether the level of the sixth contact 104f (Fmax2/Inverse-FLB) is a high level (step CS233). The operation at step CS233 is repeated as long as the level of the sixth contact 104f (Fmax2/Inverse-FLB) is a low level. If it is determined at step CS233 that the level of the sixth contact 104f (Fmax2/Inverse-FLB) is a high level (if YES, at step CS233), control returns, i.e., control proceeds to step CS107.

Image-shake Compensation Data Setting Process

The image-shake compensation data setting process, which is performed at step CS137 on condition that the photographing lens 200 mounted to the camera body 100 is of a type which incorporates an image-shake compensation device, will be hereinafter discussed in detail with reference to the flow chart shown in FIG. 11. FIG. 12A shows fundamental elements of a control system of an embodiment (first embodiment) of the photographing lens 200 which incorporates an image-shake compensation device. FIG. 12B shows a conceptual diagram of a compensation lens (an image-stabilizing optical system) LC of the image-shake compensation device. The image-shake compensation device includes a pair of sensors, i.e., an X-direction angular speed sensor (horizontal-vibration sensor) 251 and a Y-direction angular speed sensor (vertical-vibration sensor) 252, for determining magnitude and direction of the vibration of the photographing lens 200 due to hand movement. If a state where the photographing lens 200 is properly mounted to the camera body 100 and normally held in a horizontal position is considered as a reference state, the X-direction angular speed sensor 251 senses the angular speed of the photographing lens 200 in the horizontal direction of the optical axis thereof (in the X-direction about the Y-axis), while the Y-direction angular speed sensor senses the angular speed of the photographing lens 200 in the horizontal direction of the optical axis thereof (in the Y-direction about the X-axis) wherein an intersection point of the optical axis of the photographing lens 200 and the picture plane defines the intersection point of the X-axis and the Y-axis. Each of the vertical and horizontal vibration sensors can be a conventional gyro sensor. The vertical-vibration sensor exclusively senses the shake of the photographing lens 200 in the vertical direction, while the horizontal-vibration sensor exclusively senses the shake of the photographing lens 200 in the horizontal direction.

The image-shake compensation device of the photographing lens 200 is provided with the compensation lens LC (see FIG. 12B), and operates to compensate the shaking of the object image on the picture plane by driving the compensation lens LC in the X-direction and the Y-direction with an X-motor 254 and a Y-motor 257, respectively, in a plane perpendicular to the optical axis of the photographing lens 200. The position of the compensation lens LC is sensed by the number of pulses output from each of an X-direction photo-interrupter 255 and a Y-direction photo-interrupter 258 when the compensation lens LC is driven, wherein a position where the optical axis of the compensation lens LC coincides with the optical axis of the photographing lens 200 is regarded as a reference position. Rotation of each of the X-motor 254 and the Y-motor 257 is controlled by the lens CPU 211 via an X-motor driver 253 and a Y-motor driver 256, respectively.

Note that the X-direction angular speed sensor 251, the Y-direction angular speed sensor 252, the X-motor driver 253, the Y-motor driver 256, the X-motor 254, the Y-motor 257, X-direction photo-interrupter 255, the Y-direction photo-interrupter 258, and the compensation lens LC collectively constitute the image-shake compensation device.

The lens CPU 211 serves as a controller and an arithmetic processing unit for the image-shake compensation device. The lens CPU 211 starts operating immediately after the image-shake compensation switch SW1 is turned ON to determine the direction of driving of the compensation lens LC and the amount of movement (speed) thereof to drive the X-motor 254 and the Y-motor 257.

Figure 11:
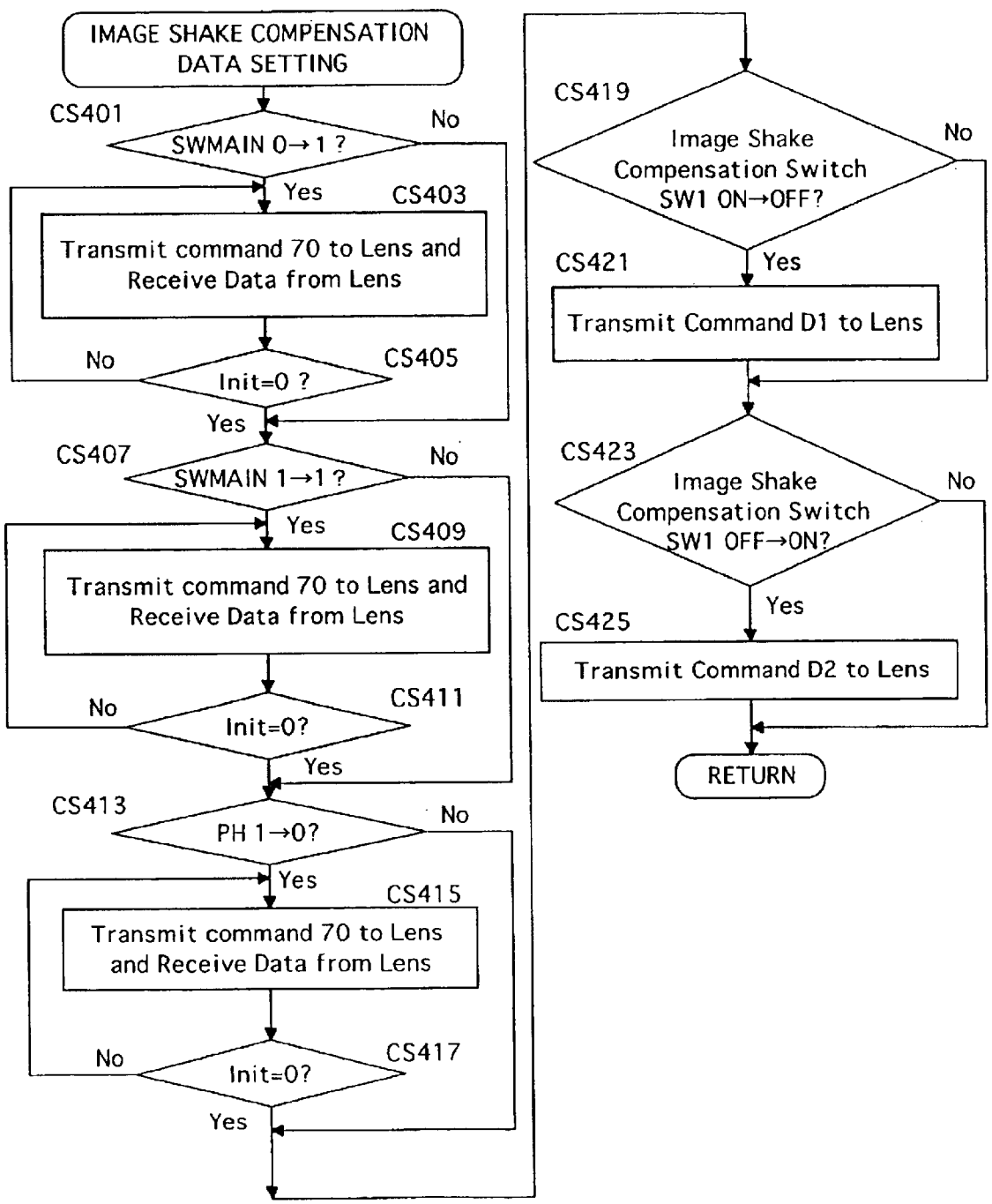
FIG. 11 is a flow chart for an image-shake compensation data setting process of the camera body.
Figure 12B:
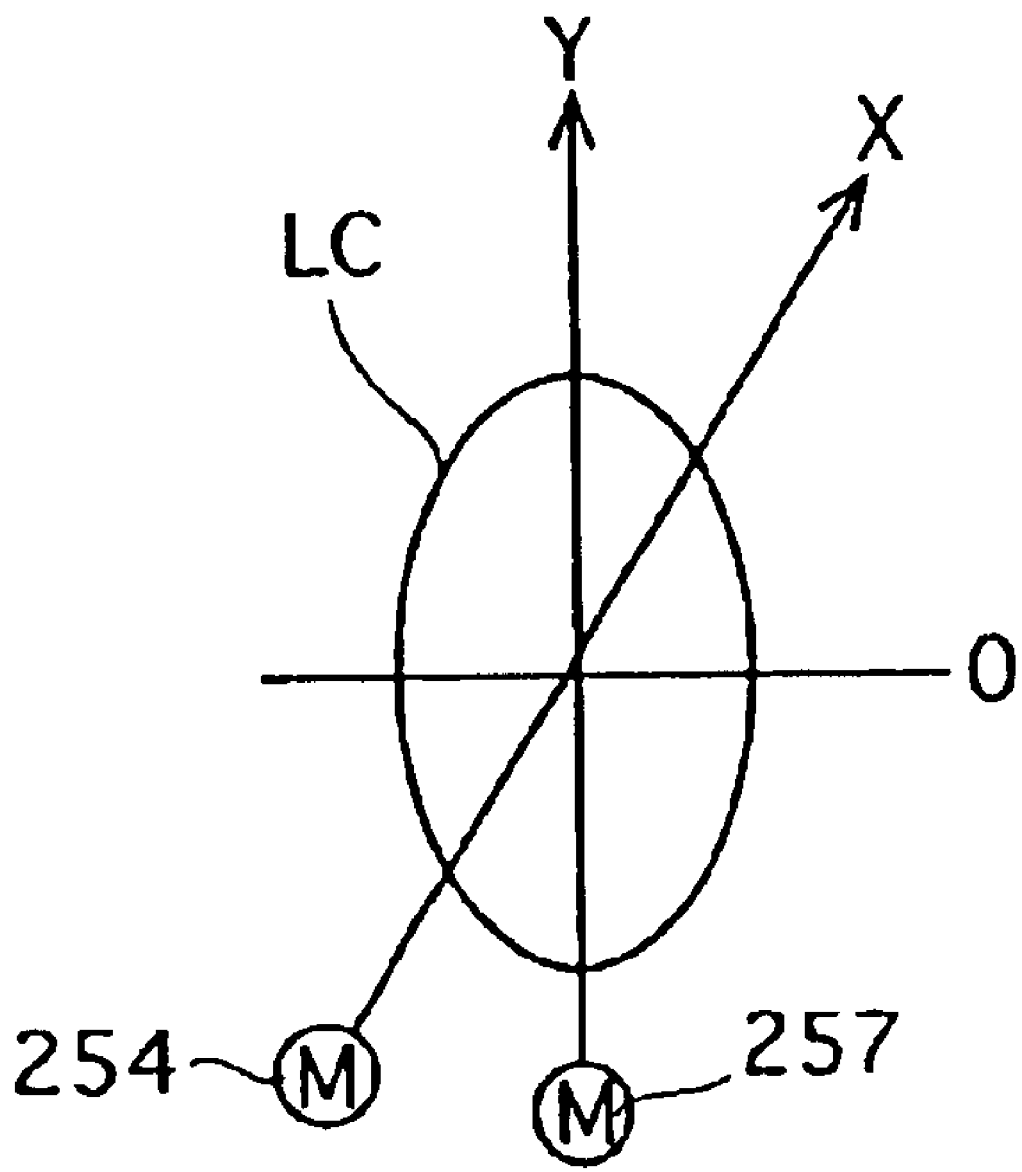
FIG. 12B is a conceptual diagram of a compensation lens (an image-stabilizing optical system) LC of the image-shake compensation device.

In the image-shake compensation data setting process shown in FIG. 11, firstly, it is determined whether the main switch flag SWMAIN has changed from "0" to "1" (step CS401). If the main switch flag SWMAIN has changed from "0" to "1" (if YES at step CS401), command 70 is transmitted to the photographing lens 200 to receive data therefrom (step CS403). Subsequently, the lens CPU 211 waits for an initialize flag Init "0" to be transmitted from the camera body 100 (step CS405). Namely, it is determined at step CS405 whether the initialize flag Init is "0". Control returns to step CS403 if the initialize flag Init is not "0".

Command 70 is data which is transmitted from the camera body 100 to the photographing lens 200 to make the photographing lens 200 send the status thereof (status data) to the camera body 100. In the present embodiment of the SLR camera system, the status data which is transmitted from the photographing lens 200 to the camera body 100, immediately after the photographing lens 200 receives command 70, is represented by one-byte data, wherein the 7th bit thereof is defined as the initialize flag Init. The 0th bit of the one-byte data is defined as an identification bit which indicates whether an AF switch is ON or OFF. The 1st bit of the one-byte data is defined as an identification bit which indicates whether the diaphragm is set automatically or manually. The 6th bit of the one-byte data is defined as an identification bit which indicates whether any function of the photographing lens 200 is in operation or not. Each of the second through fifth bits is undefined. Therefore, each of the second through fifth bits can be defined as a specific identification bit if any new function is added to the photographing lens 200. It should be noted that 0 bit or no data indicates negation.

The initialize flag Init is changed from "1" to "0" and output from the photographing lens 200 to the camera body 100 when an operation at step LS117 or LS125, in which the compensation lens LC is driven to return to the initial position thereof where the optical axis of the compensation lens coincides with the optical axis of the photographing lens 200, is completed. If it is determined at step CS405 that the initialize flag Init is "0", control proceeds to step CS407. If it is determined at step CS401 that the main switch flag SWMAIN has not changed from "0" to "1" (if NO at step CS401), control proceeds straight from step CS401 to CS407.

At step CS407, it is determined whether the main switch flag SWMAIN has changed from "1" to "0". If the main switch flag SWMAIN has changed from "1" to "0" (if YES at step CS407), this means that the main switch SWMAIN has turned from ON to OFF, so that subsequently command 70 is transmitted to the photographing lens 200 to receive data therefrom (step CS409). Subsequently, the lens CPU 211 waits for the initialize flag Init "0" to be transmitted from the camera body 100 (step CS411). Namely, it is determined at step CS411 whether the initialize flag Init is "0". Control returns to step CS409 if the initialize flag Init is not "0".

If it is determined at step CS411 that the initialize flag Init is "0", control proceeds to step CS413. If it is determined at step CS407 that the main switch flag SWMAIN has not changed from "1" to "0" (if NO at step CS407), control proceeds straight from step CS407 to CS413.

If it is determined at step CS413 that the power hold flag PH has changed from "1" to "0" (if YES at step CS413), command 70 is transmitted to the photographing lens 200 to receive data therefrom (step CS415). Subsequently, the lens CPU 211 waits for the initialize flag Init "0" to be transmitted from the camera body 100 (step CS417). Namely, it is determined at step CS417 whether the initialize flag Init is "0". Control returns to step CS415 if the initialize flag Init is not "0". If it is determined at step CS417 that the initialize flag Init is "0", control proceeds to step CS419. If it is determined at step CS413 that the power hold flag PH has not changed from "1" to "0" (if NO at step CS413), control proceeds straight from step CS413 to CS419.

At step CS419 it is determined whether the image-shake compensation switch SW1 has been turned from ON to OFF. If the image-shake compensation switch SW1 has been turned from ON to OFF (if YES at step CS419), command D1 (individual function data) for turning OFF the image-shake compensation function of the photographing lens 200 is transmitted thereto (step CS421), and subsequently control proceeds to step CS423. Upon receiving command D1, the photographing lens 200 completes the image-shake compensation operation. If the image-shake compensation switch SW1 has not been turned from ON to OFF (if NO at step CS419), control skips CS421 to proceed straight from step CS419 to step CS423. At step CS423 it is determined whether the image-shake compensation switch SW1 has been turned from OFF to ON. If the image-shake compensation switch SW1 has been turned from OFF to ON (if YES at step CS423), command D2 (individual function data) for turning ON the image-shake compensation function of the photographing lens 200 is transmitted thereto (step CS425), and subsequently control returns. If the image-shake compensation switch SW1 has not been turned from OFF to ON (if NO at step CS423), control skips CS425 and returns. Upon receiving command D2, the photographing lens 200 starts the image-shake compensation operation.

Figure 13:
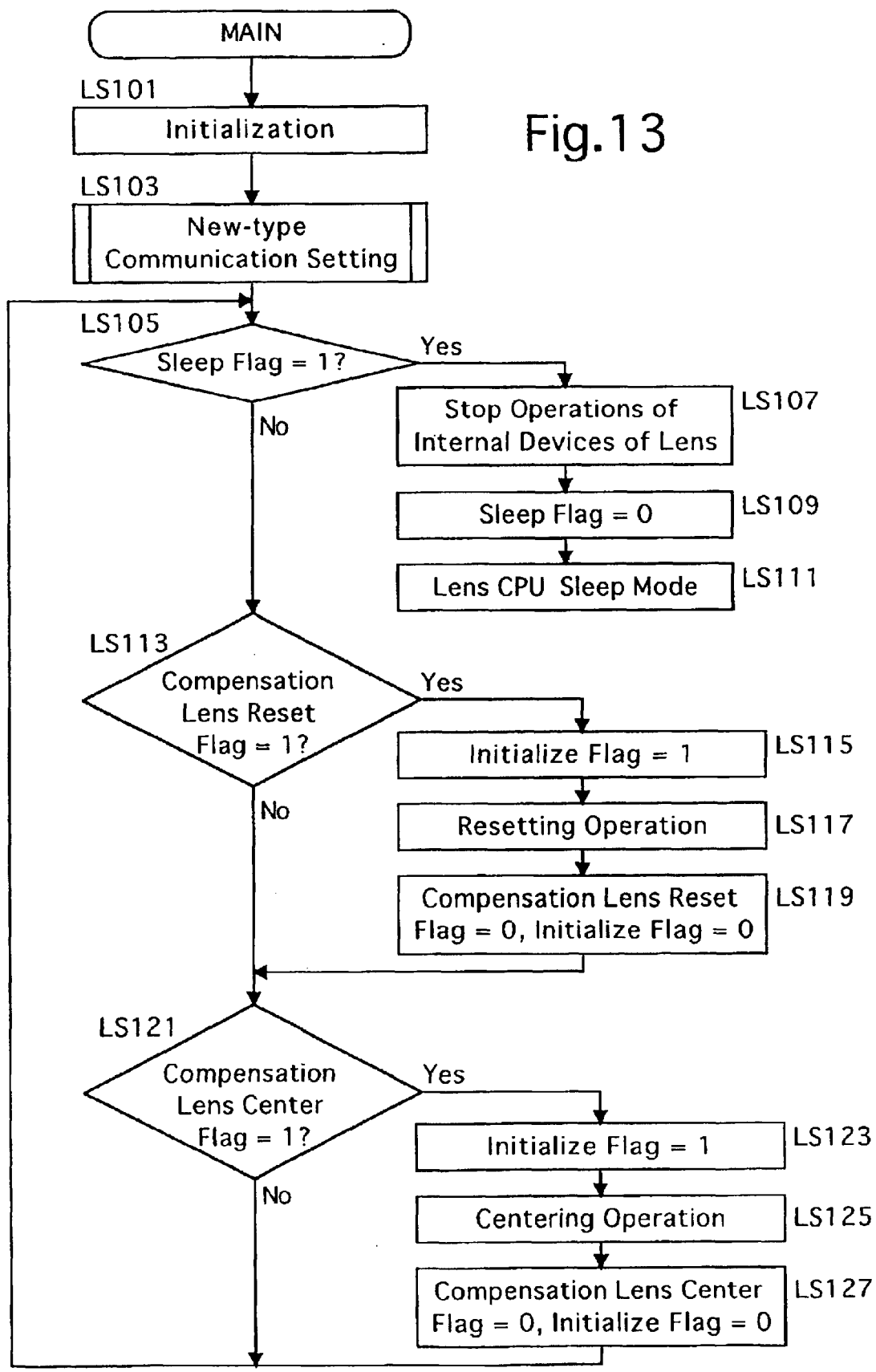
FIG. 13 is a flow chart for a main process of the first embodiment of the photographing lens.

Fundamental operations and processes performed by the lens CPU 211 of the photographing lens 200 that incorporates the image-shake compensation device will be hereinafter discussed in detail with reference to the flow charts shown in FIGS. 13 through 17. FIG. 13 shows a flow chart for the main process of the photographing lens 200 which is performed by the lens CPU 211. Control enters the main process immediately after the lens CPU 211 is supplied with power via the operation at step CS225, at which power is supplied to the power contact 105 (VPZ).

In the main process shown in FIG. 13, firstly the lens CPU 211 initializes internal RAM and ports thereof (step LS101). Subsequently, a new-type communication setting process ("new-type communication setting process" shown in FIG. 14) is performed (step LS103). In this process, a 1 ms-timer interrupt (see FIG. 15) and an interrupt via the port (inverse) INT of the lens CPU 211 (see FIG. 16) are enabled to receive an interrupt from the camera body 100 to thereby make the new-type communication possible between the new type of photographing lens (photographing lens 200) and the camera body 100.

Subsequently, it is determined whether a sleep flag which is set to "1" at step LS433 or LS 437 is "1" (step LS105). If the sleep flag is 1 (if YES at step LS105), the lens CPU 211 stops operations of internal devices of the photographing lens 200 such as the lens motor (step LS107), the sleep flag is set to "0" (step LS109), and the lens CPU 211 enters the sleep mode (step LS111). The lens CPU 211 "wakes up" upon receiving an interrupt signal via the port (inverse) INT thereof.

If it is determined at step CS105 that the sleep flag is not "1" (if NO at step LS105), it is determined whether a compensation lens reset flag is "1" (step LS113). If the compensation lens reset flag is "1" (if YES at step LS113), the initialize flag Init is set to "1" (step LS115). Subsequently, a resetting operation is performed (step LS117). In the resetting operation, the X-motor 254 and Y-motor 257 are driven to move the compensation lens LC to firstly a predetermined mechanical extremity (reference point) in the range of movement of the compensation lens LC, and subsequently the initial position (central position) thereof where the optical axis of the compensation lens LC coincides with the optical axis of the photographing lens 200. After the resetting operation is performed, the compensation lens reset flag and the initialize flag are set to "0" (step LS119), and control proceeds to step LS121. According to this resetting operation, the absolute position of the compensation lens LC is secured, and accordingly the compensation lens LC can be positioned precisely at the initial position (central position) thereof.

If it is determined at step LS113 that the compensation lens reset flag is not "1", it is determined whether a compensation lens center flag is "1" (step LS121). If the compensation lens center flag is not "1" (if NO at step LS121), control returns to step LS105. If the compensation lens center flag is not "1" (if YES at step LS121), the initialize flag Init is set to "1" (step LS123). Subsequently, a centering operation is performed in which the X-motor 254 and Y-motor 257 are driven to move the compensation lens LC to the initial position (central position) where the optical axis of the compensation lens LC coincides with the optical axis of the photographing lens 200 (step LS125). Subsequently, the compensation lens center flag and the initialize flag are set to "0" (step LS127), and control returns to step LS105.

The new-type communication setting process performed at step LS103 will be hereinafter discussed in detail with reference to the flow chart shown in FIG. 14. In the new-type communication setting process, firstly it is determined whether the level of the fifth contact 204e (Fmax1/Inverse-FBL) is a low level (step LS221). If the level of the fifth contact 204e (Fmax1/Inverse-FBL) is not a low level (if NO step LS221), the operation at step LS221 is performed again, so that the operation at step LS221 is repeated until the level of the fifth contact 204e (Fmax1/Inverse-FBL) falls to a low level. If the level of the fifth contact 204e (Fmax1/Inverse-FBL) is a low level (if YES step LS221), the sixth contact 204f (Fmax2/Inverse-FLB) is made to fall to a low level (step LS223), and subsequently a communication setting process is performed (step LS225). The communication setting process includes a setting process for serial communication, and an interrupt enabling process via the port (inverse) INT of the lens CPU 211.

Upon completion of the communication setting process at step LS225, it is determined whether the level of the fifth contact 204e (Fmax1/Inverse-FBL) is a high level (step LS227). If the level of the fifth contact 204e (Fmax1/Inverse-FBL) is not a high level (if NO step LS227), the operation at step LS227 is performed again, so that the operation at step LS227 is repeated until the level of the fifth contact 204e (Fmax1/Inverse-FBL) rises to a high level. If the level of the fifth contact 204e (Fmax1/Inverse-FBL) is a high level (if YES step LS227), the sixth contact 204f (Fmax2/Inverse-FLB) is raised to a high level (step LS229), and subsequently control returns.

Figure 15:
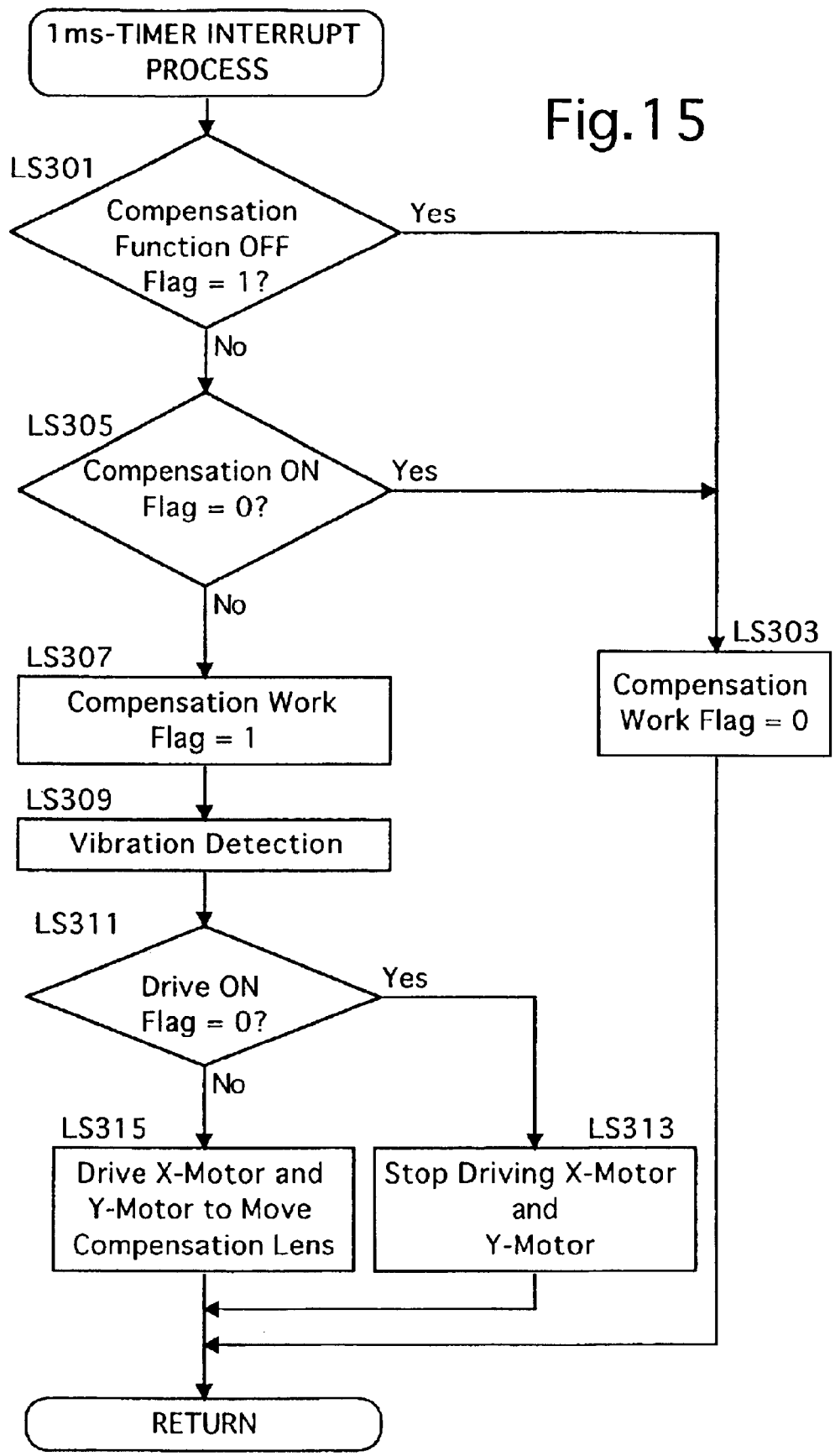
FIG. 15 is a flow chart for a 1 ms-timer interrupt process of the first embodiment of the photographing lens.

A 1 ms-timer interrupt process for the image-shake compensation operation will be hereinafter discussed in detail with reference to the flow chart shown in FIG. 15. The 1 ms-timer interrupt process starts each time a 1 ms hard timer expires during operation of the lens CPU 211. In the 1 ms-timer interrupt process, the lens CPU 211 inputs an angular speed signal from each of the X-direction angular speed sensor 251 and the Y-direction angular speed sensor 252 to detect the vibration of the photographing lens 200 due to hand movement, and subsequently determines the direction of driving of the compensation lens LC and the amount of movement (speed) thereof to drive the X-motor 254 and the Y-motor 257 to move the compensation lens LC by the determined amount of movement in the determined driving direction.

In the 1 ms-timer interrupt process, firstly it is determined whether a compensation function OFF flag is "1" (step LS301). If the compensation function OFF flag is "1" (if YES step LS301), a compensation work flag is set to "0" (step LS303) and control returns. The compensation work flag "1" or "0" indicates that the image-shake compensation device operates or does not operate, respectively.

If the compensation function OFF flag is "0" (if NO step LS301), it is determined whether a compensation ON flag is "0" (step LS305). If the compensation ON flag is "0" (if YES step LS305), this means that the image-shake compensation operation is not performed, so that the compensation work flag is set to "0" (step LS303), and control returns.

If the compensation ON flag is "1" (if NO step LS305), the compensation work flag is set to "1", and subsequently a vibration detection process is performed (step LS309). In the vibration detection process, the lens CPU inputs an angular speed signal from each of the X-direction angular speed sensor 251 and the Y-direction angular speed sensor 252 to detect the vibration of the photographing lens 200, and subsequently determines the direction of driving of the compensation lens LC and the amount of movement thereof.

After the vibration detection process at step LS309 is performed, it is determined whether a drive ON flag is "0" (step LS311). If the drive ON flag is not "0" (if NO at step LS311), the X-motor 254 and the Y-motor 257 are driven to move the compensation lens LC by the amount of movement in the determined driving direction that are determined at step LS309 (step LS315), and subsequently control returns. If the drive ON flag is "0" (if YES at step LS311), the driving of each of the X-motor 254 and the Y-motor 257 is stopped forcefully (step LS313), and control returns.

Figure 16:
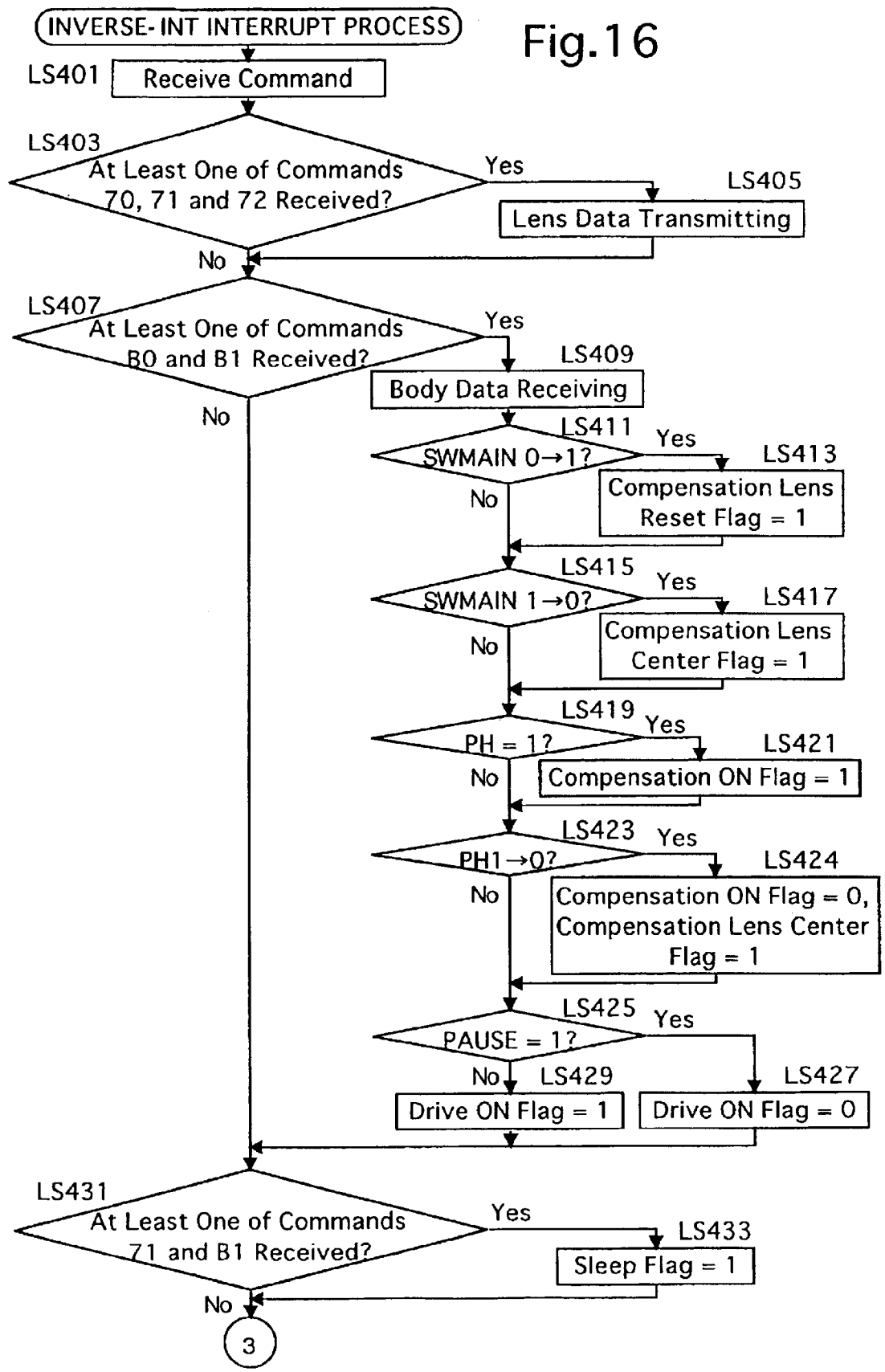
FIG. 16 is a flow chart for the first half of an inverse-INT interrupt process of the first embodiment of the photographing lens.
Figure 17:
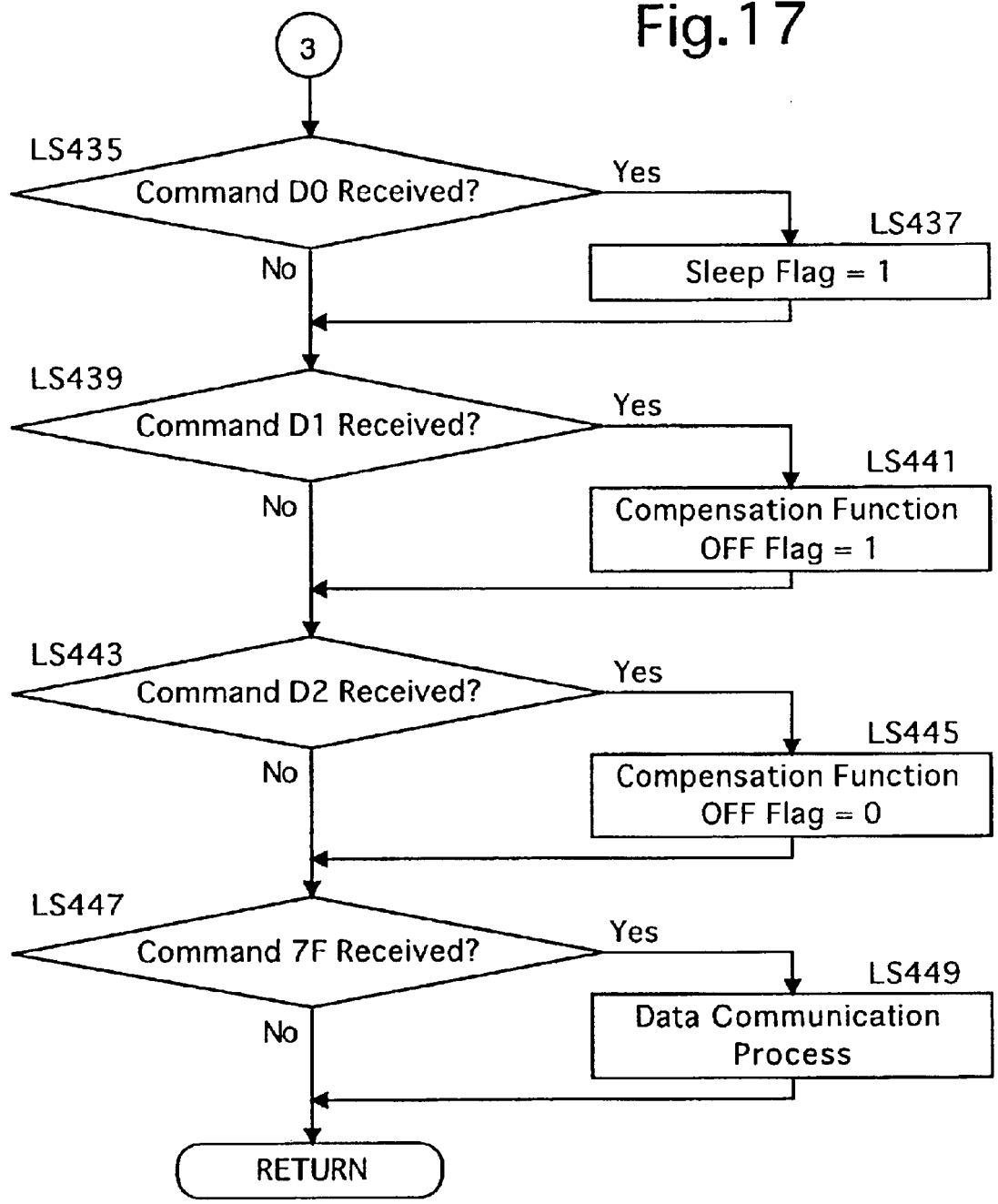
FIG. 17 is a flow chart for the remaining half of the inverse-INT interrupt process of the first embodiment of the photographing lens.

An inverse-INT interrupt process will be hereinafter discussed with reference to the flow chart shown in FIGS. 16 and 17. The inverse-INT interrupt process starts immediately after the level of the fifth contact 204e (Fmax1/Inverse-FBL) falls to a low level to thereby cause the port (inverse) INT of the lens CPU 211 to fall to a low level.

In the inverse-INT interrupt process, firstly at least one command is received from the camera body 100 via the new-type communication (step LS401). Subsequently, it is determined whether at least one of commands 70, 71 and 72 was received at step LS401 (step LS403). If at least one of commands 70, 71 and 72 was received at step LS401 (if YES at step LS403), a lens data transmitting process (8-bit data transmitting process) is performed via the new-type communication (step LS405), and control proceeds to step LS407. If none of commands 70, 71 and 72 was received at step LS401 (if NO at step LS403), control proceeds straight from step LS403 to step LS407.

At step LS407, it is determined whether at least one of commands B0 and B1 was received at step LS401. If neither of commands B0 and B1 was received at step LS401 (if NO at step LS407), control proceeds to step LS431. If at least one of commands B0 and B1 was received at step LS401 (if YES at step LS407), a body data receiving process is performed via the new-type communication (step LS409). Subsequently, it is determined whether the main switch flag SWMAIN has changed from "0" to "1" (step LS411), whether the main switch flag SWMAIN has changed from "1" to "0" (step LS415), whether the power hold flag PH is "1" (step LS419), and whether the power hold flag PH has changed from "1" to "0" (step LS423).

If it is determined at step LS411 that the main switch flag SWMAIN has changed from "0" to "1" (if YES at step LS411), the compensation lens reset flag is set to "1" (step LS413), and control proceeds to step LS415. If it is determined at step LS415 the main switch flag SWMAIN has changed from "1" to "1" (if YES at step LS415), the compensation lens center flag is set to "1" (step LS417), and control proceeds to step LS419. If it is determined at step LS419 that the power hold flag PH is "1" (if YES at step LS419), the compensation ON flag is set to "1" (step LS421), and control proceeds to step LS423. If it is determined at step LS423 that the power hold flag PH has changed from "1" to "0" (if YES at step LS423), the compensation ON flag is set to "1" and the compensation lens center flag is set to "1" (step LS424), and control proceeds to step LS425. If it is determined "NO" at all of steps LS411, LS415, LS419 and LS423, control proceeds from step LS411 to step LS425 with none of the operations at steps LS413, LS417, LS421 and LS424 being performed.

At step LS425, it is determined whether the flag PAUSE is "1". If the flag PAUSE is "1" (if YES at step LS425), the drive ON flag is set to "0" (step LS427), and control proceeds to step LS431. If the flag PAUSE is "0" (if NO at step LS425), the drive ON flag is set to "1" (step LS429), and control proceeds to step LS431. The flag PAUSE is set to "1" when any high power operation which requires a large current is currently performed. In the present embodiment of the SLR camera system, the flag PAUSE is set to "1" when the electronic flash is in the middle of charging (step CS311). Subsequently, the lens CPU 211 sets the drive ON flag to "0" upon receipt of the flag PAUSE "1" (step LS427), and control proceeds from step LS311 to step LS313 to stop the driving of each of the X-motor 254 and the Y-motor 257 forcefully in the 1 ms-timer interrupt process shown in FIG. 15. However, the X-direction angular speed sensor 251 and the Y-direction angular speed sensor 252 continue to operate.

It is determined at step LS431 whether at least one of commands 71 and B1 was received at step LS401. If at least one of commands 71 and B1 was received at step LS401 (if YES at step LS431), the sleep flag is set to "1" (step LS433), and control proceeds to step LS435. If neither of commands 71 and B1 was received at step LS401 (if NO at step LS431), control proceeds from step LS431 to step LS435. If the sleep flag is set to "1", control proceeds from step LS105 to step LS107 so that the lens CPU 211 enters the sleep mode in the main process shown in FIG. 13.

Command 71 is data which is transmitted from the camera body 100 to the photographing lens 200 to make the photographing lens 200 send the status thereof to the camera body 100, and also to make the lens CPU 211 enter a sleep mode together with the body CPU 111.

At step LS435, it is determined whether command D0 was received at step LS401. If command D0 was received at step LS401 (if YES at step LS435), the sleep flag is set to "1" (step LS437), and control proceeds to step LS439. If command D0 was not received at step LS401 (if NO at step LS435), control proceeds straight from step LS435 to step LS439.

At step LS439, it is determined whether command D1 was received at step LS401. If command D1 was received at step LS401 (if YES at step LS439), the compensation function OFF flag is set to "1" (step LS441), and control proceeds to step LS443. If command D1 was not received at step LS401 (if NO at step LS439), control proceeds straight from step LS439 to step LS443.

At step LS443 it is determined whether command D2 was received at step LS401. If command D2 was received at step LS401 (if YES at step LS443), the compensation function OFF flag is set to "0" (step LS445), and control proceeds to step LS447. If command D2 was not received at step LS401 (if NO at step LS443), control proceeds straight from step LS443 to step LS447.

At step LS447, it is determined whether command 7F was received at step LS401. If command 7F was received at step LS401 (if YES at step LS447), the lens CPU 211 performs a dummy data communication process (step LS449), and control returns. If command 7F was not received at step LS401 (if NO at step LS447), control returns.

Command 7F is data which is transmitted from the camera body 100 to the photographing lens 200 to make a rear converter output data therefrom, if the rear converter is mounted between the camera body 100 and the photographing lens 200. The communication process at step LS449 is performed to allocate communication channel for the body CPU 111 so that the body CPU 111 can receive data output from the rear converter.

Fundamental structures and processes of an embodiment of the photographing lens 200 which incorporates an image-shake compensation device have been described above. Another embodiment (second embodiment) of the photographing lens 200 which incorporates a lens AF system will be hereinafter discussed with reference to FIGS. 22 through 26. It should be noted that elements and processes/processes in the second embodiment of the photographing lens 200 which are similar to those in the first embodiment of the photographing lens 200 shown in FIGS. 12 through 17 are respectively designated by similar reference numerals and step numbers.

Figure 22:
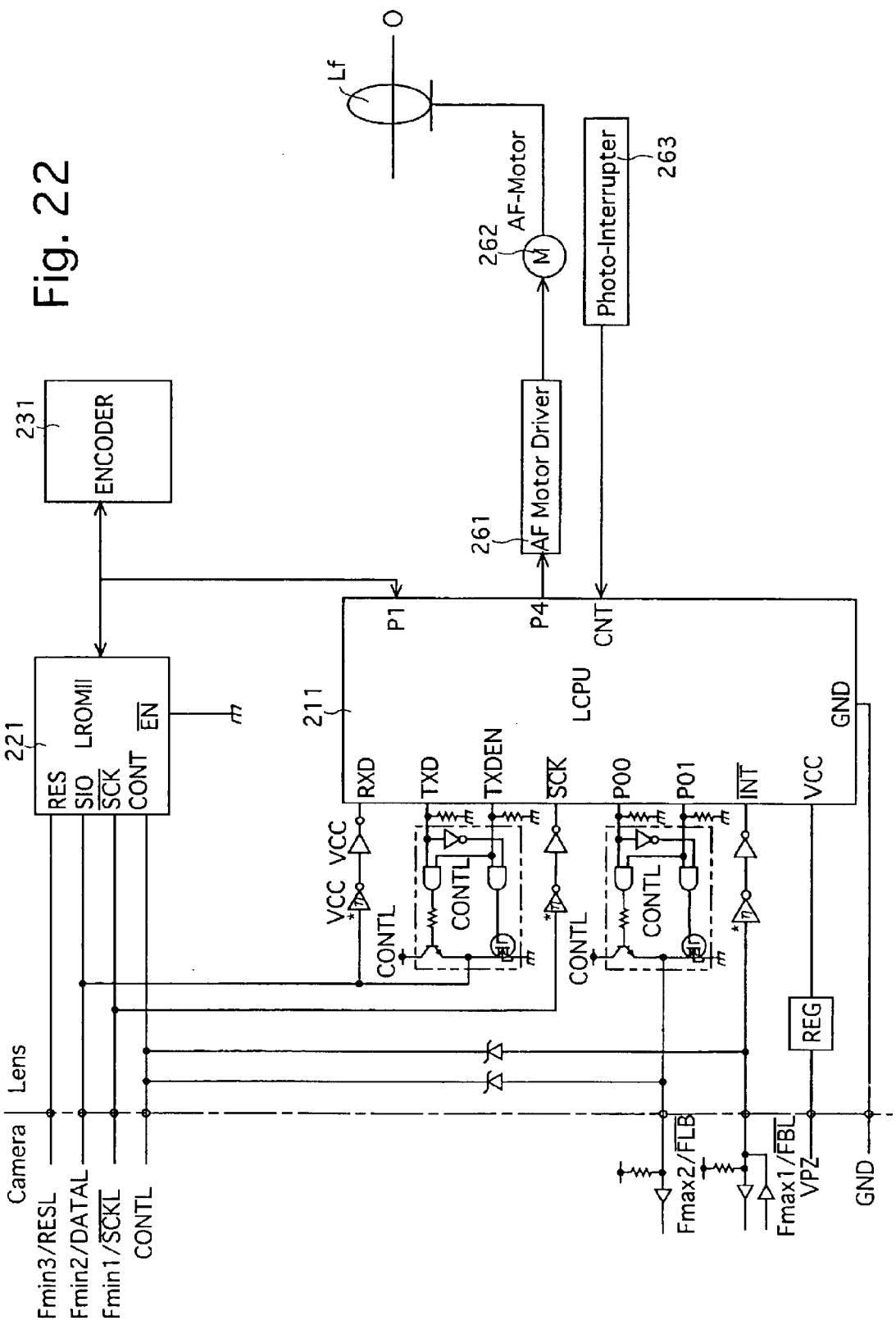
FIG. 22 is a block diagram of fundamental elements of a communication control system of a second embodiment of the photographing lens 200 which incorporates a lens AF system.

FIG. 22 is a block diagram of fundamental elements of a communication control system of the second embodiment of the photographing lens 200 which incorporates a lens AF system. The second embodiment of the photographing lens 200 is provided with an AF motor driver 261, an AF motor (lens motor) 262 and a photo-interrupter 263. The lens CPU 211 drives the AF motor 262 via the AF motor driver 261 in accordance with data on the driving-amount of the AF motor 262 and the driving direction thereof that is received from the body CPU 111 to move a focusing lens group Lf along the optical axis thereof to an axial position thereon at which an in-focus state is obtained. The amount of movement of the focusing lens group Lf is detected by counting the number of pulses output from the photo-interrupter 263.

Figure 23:
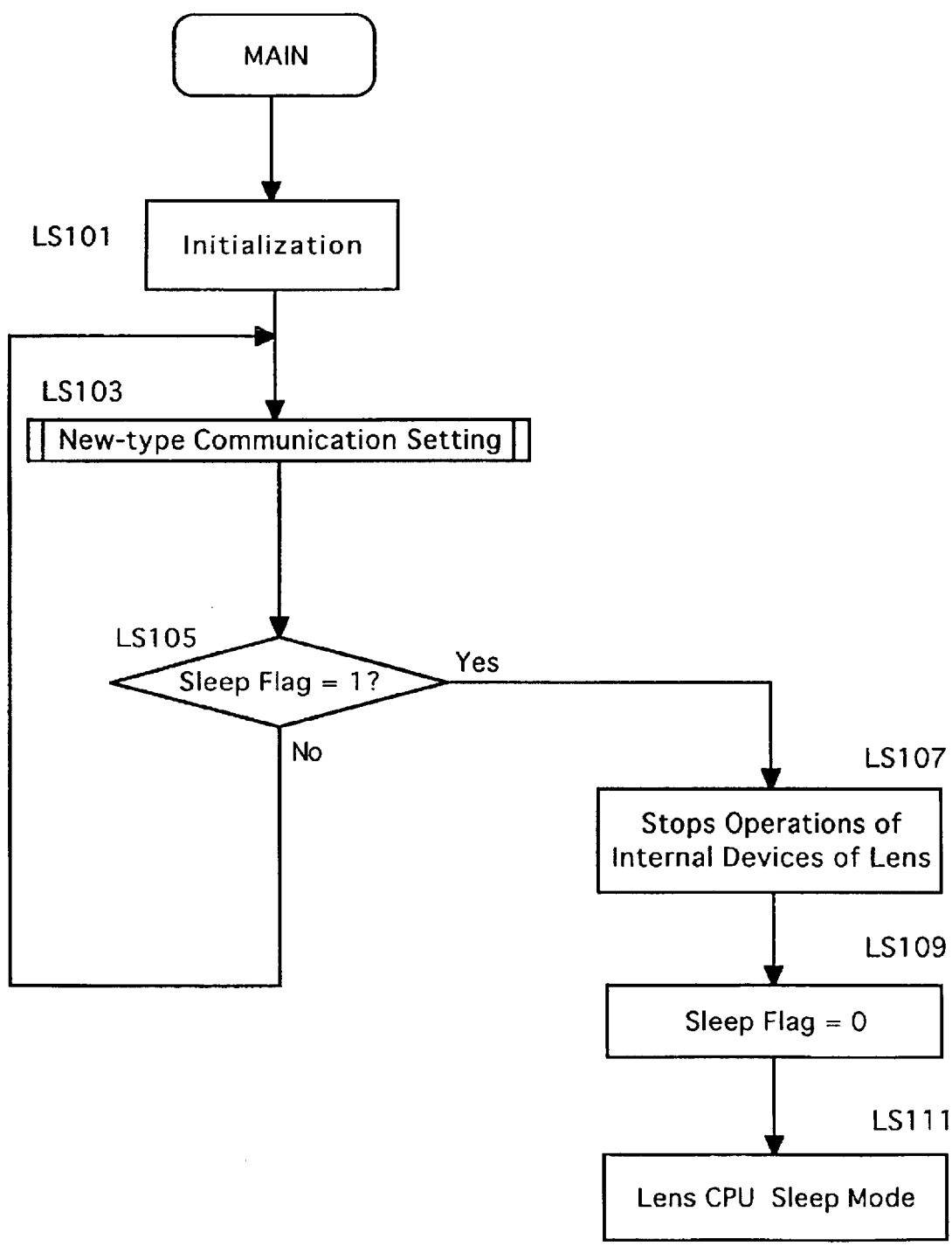
FIG. 23 is a flow chart for a main process of the second embodiment of the photographing lens.

FIG. 23 shows a flow chart for the main process of the second embodiment of the photographing lens 200 which incorporates a lens AF system. Control enters the main process immediately after the lens CPU 211 is supplied with power via the operation at step CS225, at which power is supplied to the power contact 105 (VPZ).

In the main process shown in FIG. 23, firstly the lens CPU 211 initializes internal RAM and ports thereof (step LS101). Subsequently, the new-type communication setting process ("new-type communication setting process" shown in FIG. 14) is performed (step LS103). In this process, a 1 ms-timer interrupt (see FIG. 24) and an interrupt via the port (inverse) INT of the lens CPU 211 (see FIG. 25) are enabled to receive an interrupt from the camera body 100 to thereby make the new-type communication possible between the photographing lens 200 and the camera body 100.

Subsequently, it is determined whether a sleep flag which is set to "1" at step LS433 or LS437 is "1" (step LS105). If the sleep flag is "1" (if YES at step LS105), the lens CPU 211 stops internal devices of the photographing lens 200 such as the AF motor 262 and the photo-interrupter 263 (step LS107), the sleep flag is set to "0" (step LS109), and the lens CPU 211 enters the sleep mode (step LS111). The lens CPU 211 wakes upon receiving an interrupt signal via the port (inverse) INT thereof.

Figure 24:
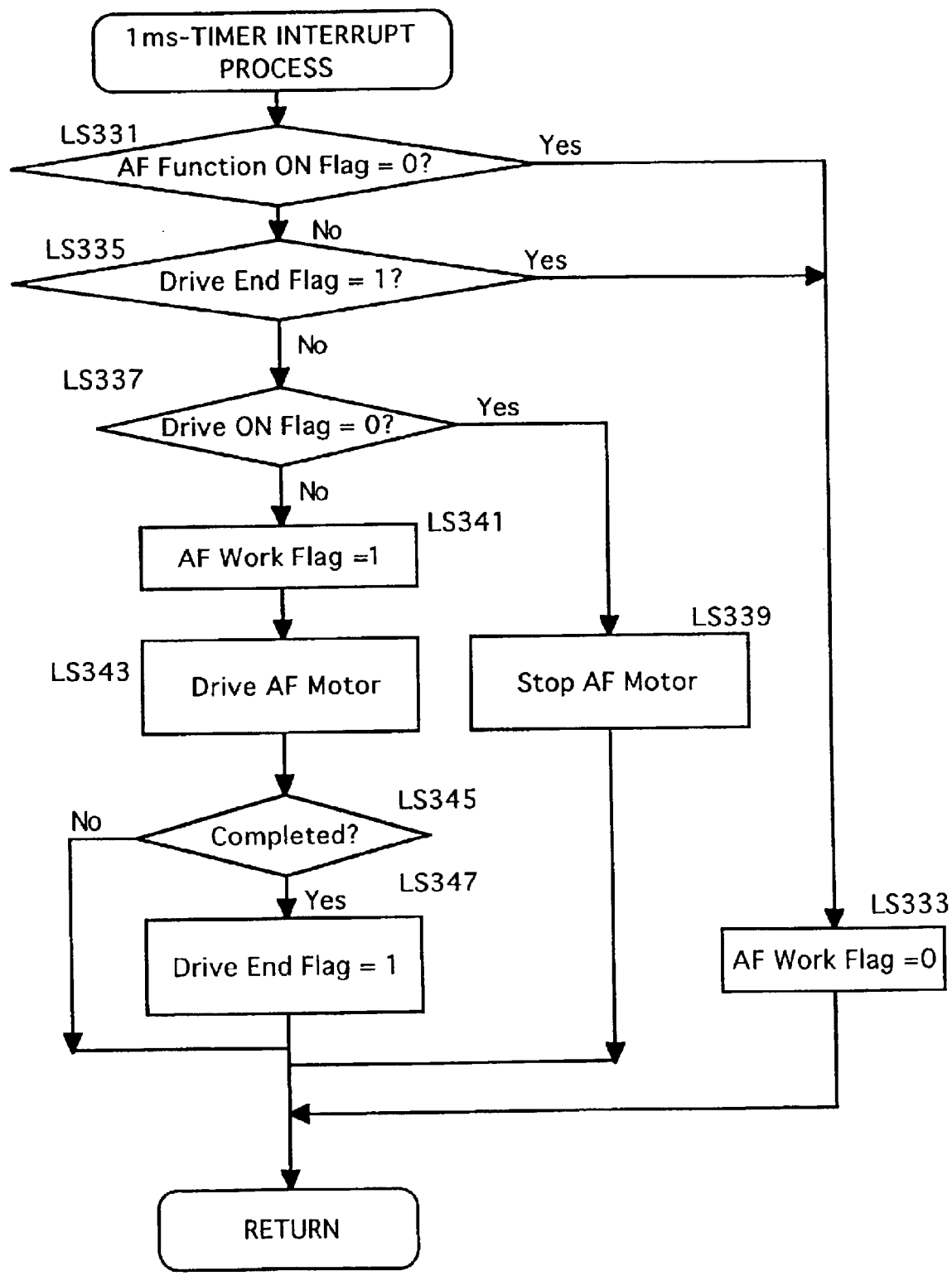
FIG. 24 is a flow chart for a 1 ms-timer interrupt process of the second embodiment of the photographing lens.
Figure 25:
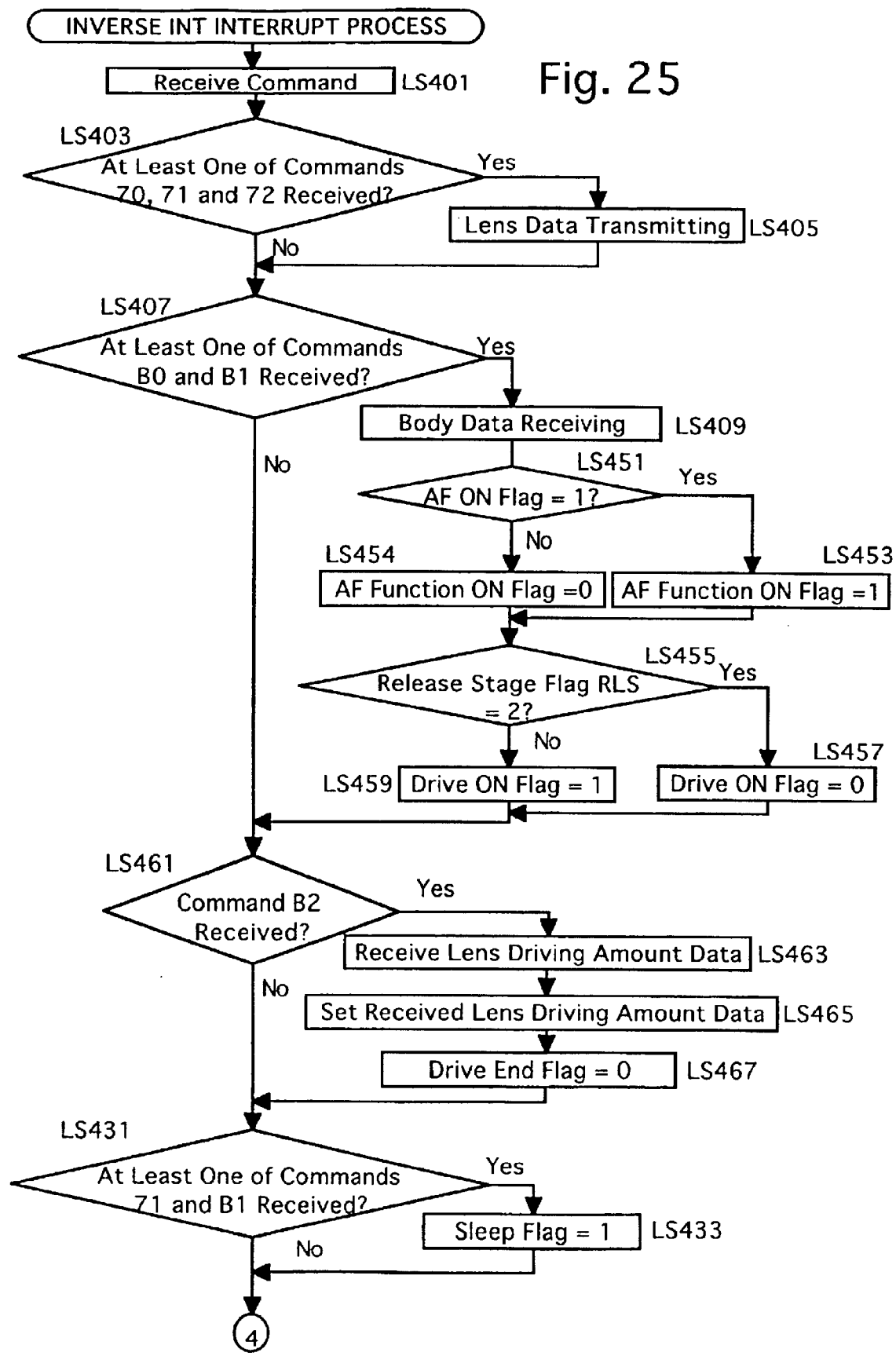
FIG. 25 is a flow chart for the first half of an inverse-INT interrupt process of the second embodiment of the photographing lens.

If it is determined at step CS105 that the sleep flag is not "1" (if NO at step LS105), the operation at step LS105 is repeated. The new-type communication setting process shown in FIG. 14, a 1 ms-timer interrupt process shown in FIG. 24, and an inverse-INT interrupt process shown in FIG. 25 are performed during the time the operation at step LS105 is repeated.

Figure 14:
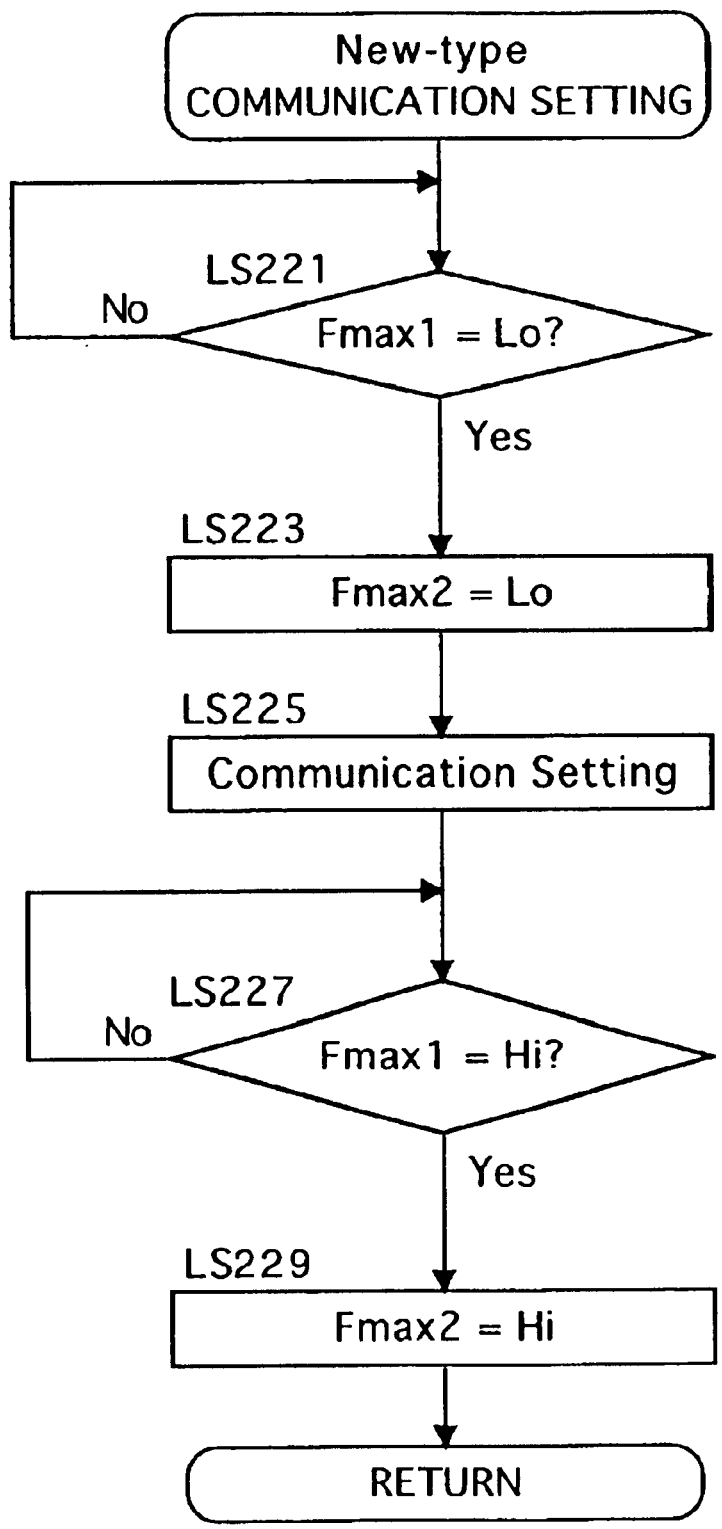
FIG. 14 is a flow chart for a new-type communication setting process of the photographing lens.

The new-type communication setting process performed at step LS103 shown in FIG. 23 is identical to that shown in FIG. 14, and accordingly further description of the new-type communication setting process performed at step LS103 shown in FIG. 23 is omitted.

The 1 ms-timer interrupt process which is repeated at regular intervals when the lens CPU 211 is in operation, in the second embodiment of the photographing lens 200, will be hereinafter discussed with reference to the flow chart shown in FIG. 24. This 1 ms-timer interrupt process starts each time a 1 ms hard timer expires during operation of the lens CPU 211 to control operation of the AF motor 262.

In the 1 ms-timer interrupt process, firstly it is determined whether an AF function ON flag is "0" (step LS331). If the AF function ON flag is "0" (if YES step LS331), a lens AF process is not performed, wherein an AF work flag is set to "0" (step LS333), and control returns. The AF work flag "1" or "0" indicates that the lens AF process operates or does not operate, respectively.

If the AF function ON flag is not "0" (if NO step LS331), it is determined whether a drive end flag is "1" (step LS335). If the drive end flag is "1" (if YES at step LS335), this means that the driving of the AF motor 262 has been completed, so that the AF work flag is set to "0" (step LS333) and control returns.

If the drive end flag is not "1" (if NO at step LS335), it is determined whether a drive ON flag is "0" (step LS337). If the drive ON flag is "0" (if YES at step LS337), the AF motor 262 is stopped forcefully (step LS339), and control returns.

If the drive ON flag is not "0" (if NO at step LS337), the AF work flag is set to "1" (step LS341), and subsequently the AF motor 343 is started (driven) (step LS343). Subsequently, it is determined whether the driving of the AF motor 343 is completed (step LS345). If the driving of the AF motor 343 is completed (if YES at step LS345), the drive end flag is set to "1" (step LS347), and control returns. If the driving of the AF motor 343 has not been completed (if NO at step LS345), control returns.

Figure 26:
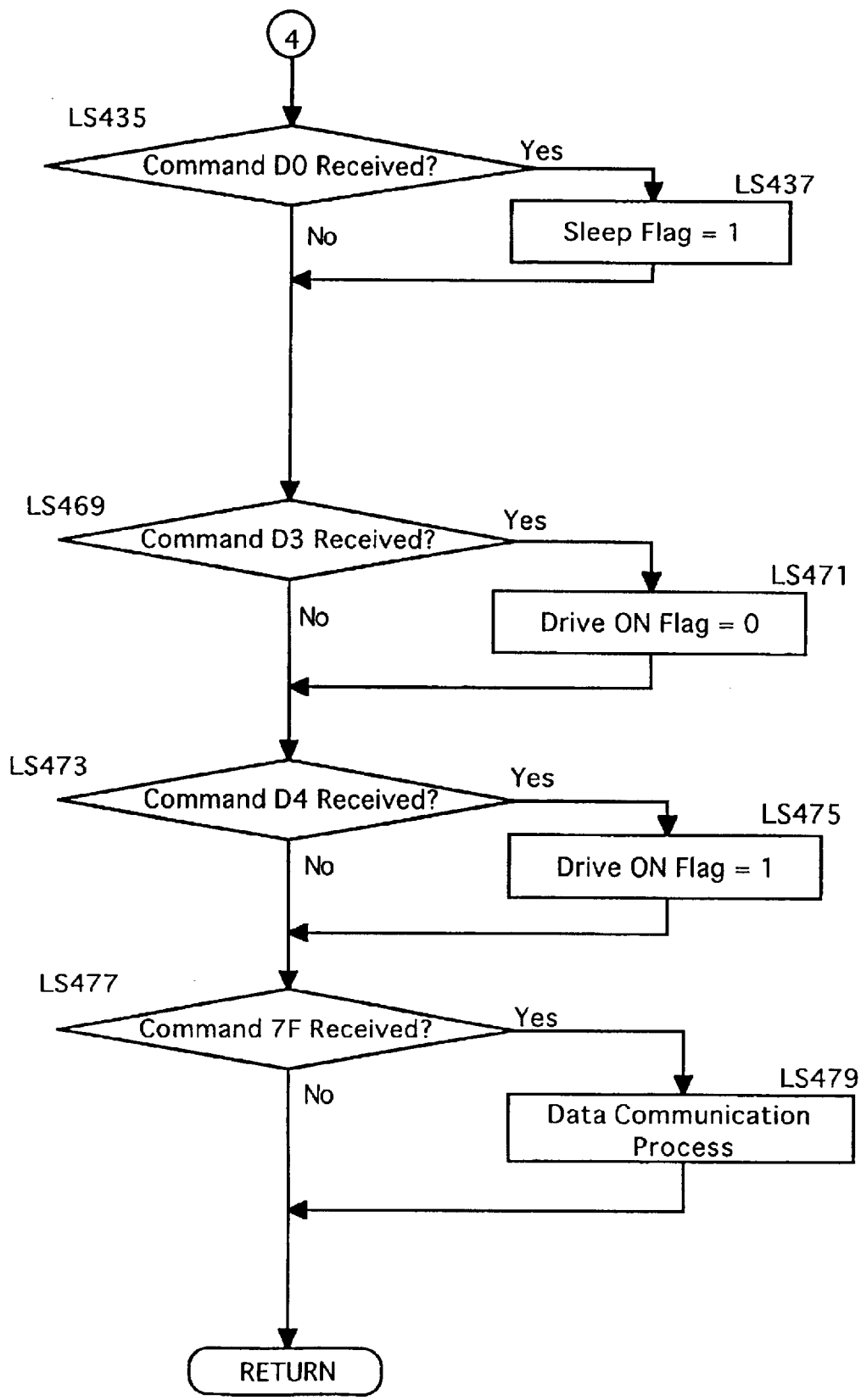
FIG. 26 is a flow chart for the remaining half of the inverse-INT interrupt process of the second embodiment of the photographing lens.

An inverse-INT interrupt process in the second embodiment of the photographing lens 200 will be hereinafter discussed with reference to the flow chart shown in FIGS. 25 and 26. The inverse-INT interrupt process starts immediately after the level of the fifth contact 204e (Fmax1/Inverse-FBL) falls to a low level to thereby cause the port (inverse) INT of the lens CPU 211 to fall to a low level.

In the inverse-INT interrupt process, firstly at least one command is received from the camera body 100 via the new-type communication (step LS401). Subsequently, it is determined whether at least one of commands 70, 71 and 72 was received at step LS401 (step LS403). If at least one of commands 70, 71 and 72 was received at step LS401 (if YES at step LS403), a lens data transmitting process (8-bit data transmitting process) is performed via the new-type communication, and control proceeds to step LS407. If none of commands 70, 71 and 72 was received at step LS401 (if NO at step LS403), control proceeds straight from step LS403 to step LS407.

At step LS407, it is determined whether at least one of commands B0 and B1 was received at step LS401. If neither of commands B0 and B1 was received at step LS401 (if NO at step LS407), control proceeds to step LS461. If at least one of commands B0 and B1 was received at step LS401 (if YES at step LS407), a body data receiving process is performed via the new-type communication (step LS409). Subsequently, it is determined whether the AF ON flag is "1" (step LS451). If the AF ON flag is "1", (if YES at step LS451), the AF function ON flag is set to "1" (step LS453), and control proceeds to step LS455. If the AFON flag is not "1", (if NO at step LS451), the AF function ON flag is set to "0" (step LS454), and control proceeds to step LS455.

At step LS455 it is determined whether the release stage indicator RLS is "2". The release stage indicator RLS is a two-bit data which is set to "0", "1", "2" or "3" by the body CPU 111. The release stage indicator RLS indicates a stage at which the quick return mirror is moving toward the retracted position thereof after the release switch SWR has been turned ON. The release stage indicator RLS "2" indicates a stage at which a film frame is under exposure after the quick return mirror has moved up to the retracted position thereof. The release stage indicator RLS "3" indicates a stage at which the camera body 100 is in a stage at which film is advanced after the exposure operation has been completed. The release stage indicator RLS "0" indicates any other stage of the camera body 100. If the release stage indicator RLS is "2" (if YES at step LS455), this means that a film frame is under exposure after the quick return mirror has moved up to the retracted position thereof, so that the drive ON flag is set to "0" (step LS457), and control proceeds to step LS461. If the release stage indicator RLS is not "2" (if NO at step LS455), the drive ON flag is set to "1" (step LS459) and control proceeds to step LS461.

At step LS461, it is determined whether command B2 was received at step LS401. If command B2 was received at step LS401 (if YES at step LS461), lens driving amount data is received from the body CPU 111 (step LS463). Subsequently, this received lens driving amount data is set (step LS465), and the drive end flag is set to "0" (step LS467). Subsequently, control proceeds to step LS431. If command B2 was not received at step LS401 (if NO at step LS461), control proceeds to step LS431.

It is determined at step LS431 whether at least one of commands 71 and B1 was received at step LS401. If at least one of commands 71 and B1 was received at step LS401 (if YES at step LS431), the sleep flag is set to "1" (step LS433) and control proceeds to step LS435. If neither of commands 71 and B1 was received at step LS401 (if NO at step LS431), control proceeds from step LS431 to step LS435. If the sleep flag is set to "1", control proceeds from step LS105 to step LS107, in the main process shown in FIG. 13, so that the lens CPU 211 enters the sleep mode.

At step LS435, it is determined whether command D0 was received at step LS401. If command D0 was received at step LS401 (if YES at step LS435), the sleep flag is set to "1"

(step LS437) and control proceeds to step LS469. If command D0 was not received at step LS401 (if NO at step LS435), control proceeds straight from step LS435 to step LS469.

At step LS469, it is determined whether command D3 was received at step LS401. If command D3 was received at step LS401 (if YES at step LS469), the drive ON flag is set to "0" (step LS471), and control proceeds to step LS473. If command D3 was not received at step LS401 (if NO at step LS469), control proceeds straight from step LS469 to step LS473.

At step LS473, it is determined whether command D4 was received at step LS401. If command D4 was received at step LS401 (if YES at step LS473), the drive ON flag is set to "1" (step LS475), and control proceeds to step LS477. If command D4 was not received at step LS401 (if NO at step LS473), control proceeds straight from step LS473 to step LS477.

At step LS477, it is determined whether command 7F was received at step LS401. If command 7F was received at step LS401 (if YES at step LS447), the lens CPU 211 performs a dummy data communication process (step LS479), and control returns. If command 7F was not received at step LS401 (if NO at step LS477), control returns.

In the present embodiment of the SLR camera system, each of the commands B0 and B1 represents body data (data on an operating status of the camera body 100) which is transmitted to the photographing lens 200 regardless of the lens type thereof, while each of the commands B2, D0, D1, D2 and D3 represents individual function data (data necessary for the corresponding function (e.g., the image-shake compensation function or the lens AF function) that the new type of photographing lens 200 possesses) which is transmitted to the photographing lens 200 in connection with the corresponding function that the new type of photographing lens 200 possesses. The camera body 100 determines the type of the photographing lens mounted to the camera body via the command 72, i.e., information on the type of the photographing lens mounted to the camera body.

As can be understood from the above descriptions, according to the present embodiment of the SLR camera system to which the present invention is applied, the camera body sends commands 70, 71, 72, B0 and B1 to the photographing lens 200 regardless of the lens type thereof, whereas the camera body sends commands B2, D0, D1, D2 and D3 to the photographing lens 200 after having determined the lens type thereof in accordance with command 72 (data on the type of the photographing lens mounted to the camera body). Therefore, a new function can be available only when each of the camera body 100 and the photographing lens 200 mounted thereto is designed for the new function. If the camera body or the photographing lens mounted thereto is not designed for the new function, the other functions can still be available wherein the new function is not available. This makes it easy for the camera body 100 and the photographing lens 200 to be equipped with one or more new functions or capabilities.

The body data (the command B0 and B1) are available for CPUs of various photographing lenses for various purposes. The body data are transmitted to the photographing lens mounted to the camera body at regular intervals regardless of the type of the photographing lens; and on the other hand, the individual function data (commands B2, D0, D1, D2 and D3) are selectively transmitted to the photographing lens as necessary. Namely, the communication mode between the camera body and the photographing lens 200 differs between the body data (serving as common data and including fundamental data of the camera body) and the individual function data. Accordingly, in the case of adding a new function or capability to the photographing lens 200 or the camera body 100 (especially to the camera body 100) it is only necessary to modularize a control program for commands and/or data communications which are compliant with the photographing lens 200 having the new function, and to incorporate the modularized control program into an already-existing control program. This makes it possible to increase the degree of freedom in the development and design of the photographing lens 200 having the new function, which in turn increases the degree of freedom in the development and design of the camera body which is compatible with the photographing lens 200 having the new function. In the present embodiment of the SLR camera system, a process including the operation at steps CS135 and CS137 (see FIG. 11) corresponds to the modularized control program for the first embodiment of the photographing lens 200 having the image-shake compensation device, while a process including the operations at steps CS157 through CS161 corresponds to the modularized control program for the second embodiment of the photographing lens 200 having the lens AF system.

As can be understood from the above descriptions, according to the present embodiment of the SLR camera system to which the present invention is applied, the body data is transmitted from the camera body to the photographing lens regardless of the lens type thereof, while the photographing lens operates in accordance with the body data received from the camera body. In addition, the camera body transmits data which complies with the photographing lens mounted to the camera body in accordance with the determined lens type. This makes it easy for each of the camera body and the photographing lens to be equipped with one or more new functions or capabilities.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera system having a camera body and a photographing lens which can be mounted to and dismounted from said camera body, wherein said camera body comprises:

a determining device which determines a type of said photographing lens in accordance with data received from said photographing lens; and a body controller which functions to send body data and individual function data to said photographing lens, wherein each of said individual function data is required for a corresponding function that said photographing lens possesses;

wherein said body controller sends all said body data to said photographing lens regardless of the type of said photographing lens, and sends a portion of said individual function data associated with said type of said photographing lens to said photographing lens.

2. The camera system according to claim 1, wherein said body controller sends all said body data to said photographing lens at regular intervals, and selectively sends said individual function data to said photographing lens in accordance with said type of said photographing lens.

3. The camera system according to claim 1, wherein said photographing lens comprises a lens controller, which is configured to communicate with said body controller, wherein said lens controller sends lens type data, which indicates said type of said photographing lens, to said camera body.

4. The camera system according to claim 3, wherein, when said body controller receives said lens type data output from said lens controller, said body controller sends corresponding individual function data to said photographing lens.

5. The camera system according to claim 1, wherein said body data includes fundamental data of said camera body.

6. The camera system according to claim 5, wherein said body data includes data for a power saving operation.

7. A camera body, to which a photographing lens can be mounted and dismounted, comprising:
- a determining device which determines a type of said photographing lens in accordance with data received from said photographing lens; and
- a body controller configured to send body data and individual function data to said photographing lens, wherein each of said individual function data is required for a corresponding function that said photographing lens possesses;

wherein said body controller sends all said body data to said photographing lens regardless of the type of said photographing lens, and sends a portion of said individual function data, which is associated with said type of said photographing lens, to said photographing lens.

8. The camera body according to claim 7, wherein, when said body controller receives said lens type data output from said lens controller, said body controller sends corresponding said individual function data to said photographing lens.

9. The camera body according to claim 7, wherein said body controller sends all said body data to said photographing lens at regular intervals, and selectively sends said individual function data to said photographing lens in accordance with said type of said photographing lens.

10. A photographing lens which is configured to be mounted to, and dismounted from, a camera body, the camera body having a body controller, the photographing lens comprising:
- a memory that stores information regarding a type of the photographing lens;
- a lens controller configured to communicate with the body controller;
- wherein said body controller is configured to read the information on the type of the photographing lens from said memory, to identify the type of the photographing lens, and to thereafter said communication with said lens controller; and
- wherein said lens controller is configured to receive body data and individual function data from said body controller.

* * * * *